(12) United States Patent
Andino et al.

(10) Patent No.: US 7,407,607 B2
(45) Date of Patent: Aug. 5, 2008

(54) MOLD AND METHOD FOR CASTING OPHTHALMIC LENSES

(75) Inventors: Rafael Victor Andino, Lawrenceville, GA (US); Tracey Weldon, Duluth, GA (US); Richard Charles Turek, Atlanta, GA (US)

(73) Assignee: Novartis AG, Basel (CH)

( * ) Notice: Subject to any disclaimer, the term of this patent is extended or adjusted under 35 U.S.C. 154(b) by 448 days.

(21) Appl. No.: 11/121,569

(22) Filed: May 4, 2005

(65) Prior Publication Data

US 2005/0200034 A1  Sep. 15, 2005

Related U.S. Application Data

(62) Division of application No. 10/098,225, filed on Mar. 15, 2002, now Pat. No. 6,929,233.

(60) Provisional application No. 60/276,787, filed on Mar. 16, 2001, provisional application No. 60/334,752, filed on Oct. 31, 2001.

(51) Int. Cl.
*B29C 43/02* (2006.01)
(52) U.S. Cl. .................. 264/1.32; 264/2.2
(58) Field of Classification Search ............ 264/1.32, 264/2.2
See application file for complete search history.

(56) References Cited

U.S. PATENT DOCUMENTS

| | | |
|---|---|---|
| 2,745,138 A | 5/1956 | Beattie |
| 3,070,846 A | 1/1963 | Schrier |
| 3,902,693 A | 9/1975 | Crandon et al. |
| 4,197,266 A | 4/1980 | Clark et al. |
| 4,778,632 A * | 10/1988 | Bakalar ............ 264/2.2 |
| 4,815,690 A | 3/1989 | Shepherd |
| 5,036,971 A | 8/1991 | Seden et al. |
| 5,087,015 A | 2/1992 | Galley |
| 5,110,514 A | 5/1992 | Soane |
| 5,238,388 A | 8/1993 | Tsai |
| 5,605,656 A | 2/1997 | Sasano |
| 5,762,836 A | 6/1998 | Bos et al. |
| 5,861,031 A | 1/1999 | Namdaran et al. |
| 6,068,464 A | 5/2000 | Su et al. |
| 6,103,148 A | 8/2000 | Su et al. |
| 6,258,299 B1 | 7/2001 | Yamashita et al. |
| 6,872,335 B2 * | 3/2005 | Su et al. ............ 264/2.5 |
| 2002/0163095 A1 | 11/2002 | Andino et al. |

FOREIGN PATENT DOCUMENTS

| | | |
|---|---|---|
| EP | 0979725 | 2/2000 |
| JP | 2000006171 | 1/2000 |
| WO | WO 00/30836 | 6/2000 |

* cited by examiner

*Primary Examiner*—Mary Lynn Theisen
(74) *Attorney, Agent, or Firm*—Gardner Groff Greenwald & Villanueva, PC

(57) ABSTRACT

The invention relates generally to ophthalmic molds and methods useful for casting ophthalmic moldings. In one aspect, the invention relates to a mold for casting an ophthalmic molding formed from a first mold half detachably affixed to a second mold half, whereby the mold has a top and bottom; and a cavity formed by the first and second mold halves, wherein the cavity receives a lens forming material through an opening at the bottom of the mold and vents gas and excess lens forming material from an opening at the top of the mold. In another aspect, this invention relates to methods for casting opthalmic moldings, particularly intraocular lenses.

40 Claims, 20 Drawing Sheets

SECTION A-A

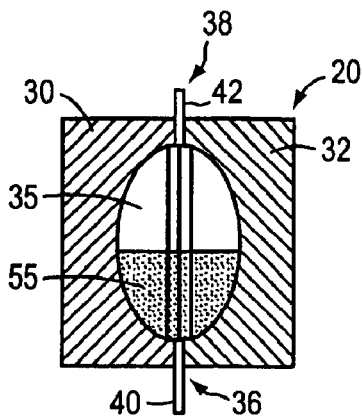
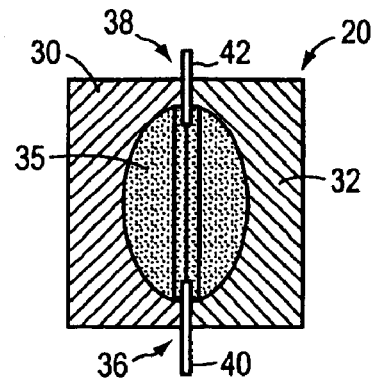
FIG. 1A    FIG. 1B
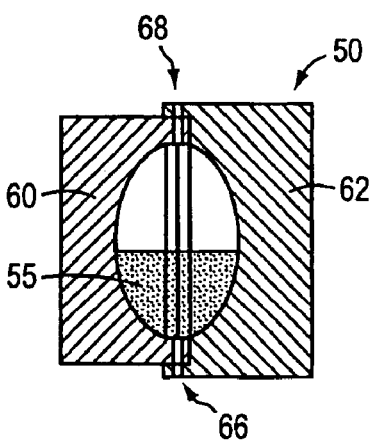
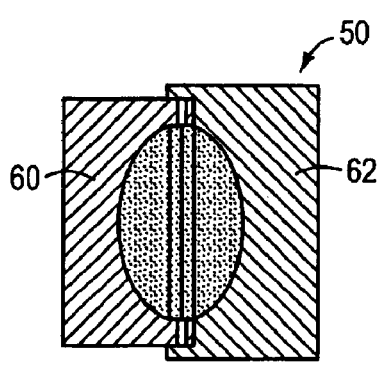
FIG. 2A    FIG. 2B
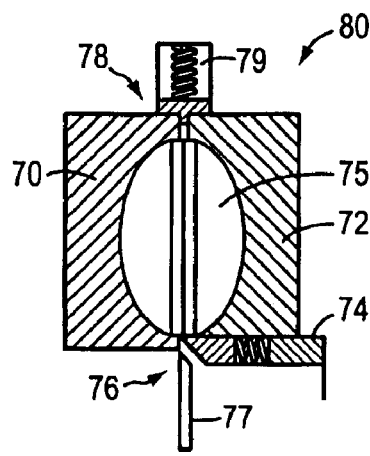
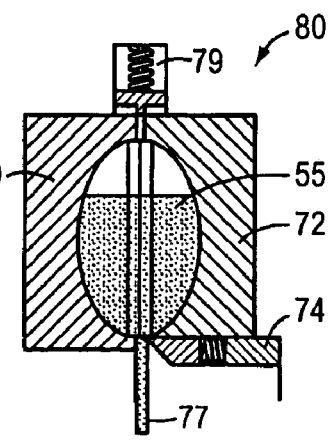
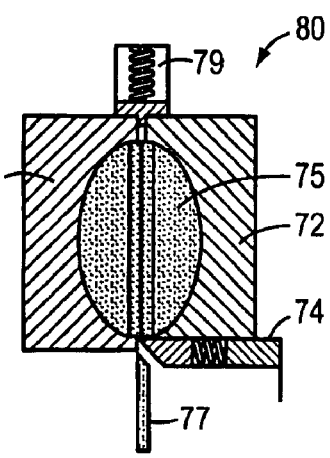
FIG. 3A    FIG. 3B    FIG. 3C

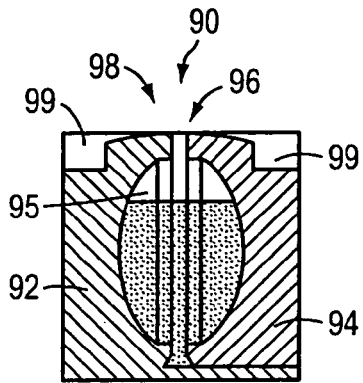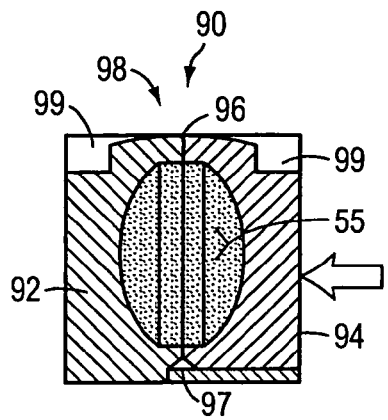
FIG. 4A  FIG. 4B
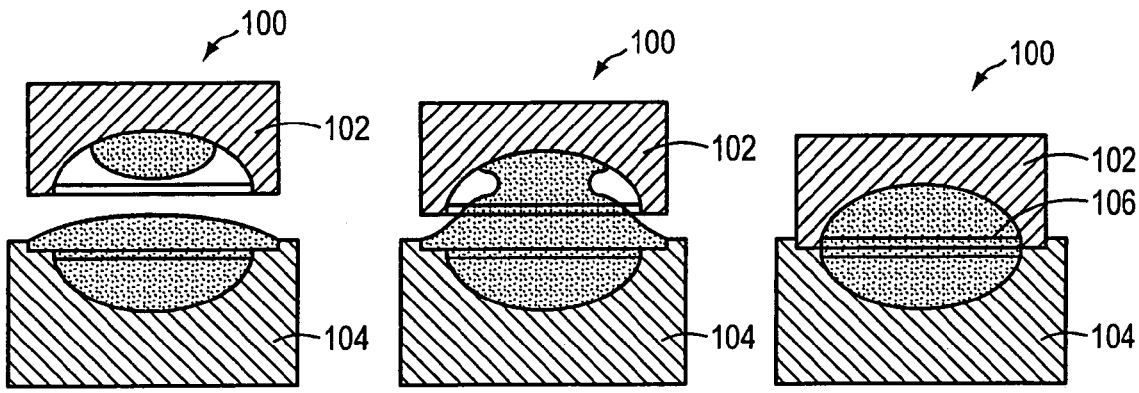
FIG. 5A  FIG. 5B  FIG. 5C
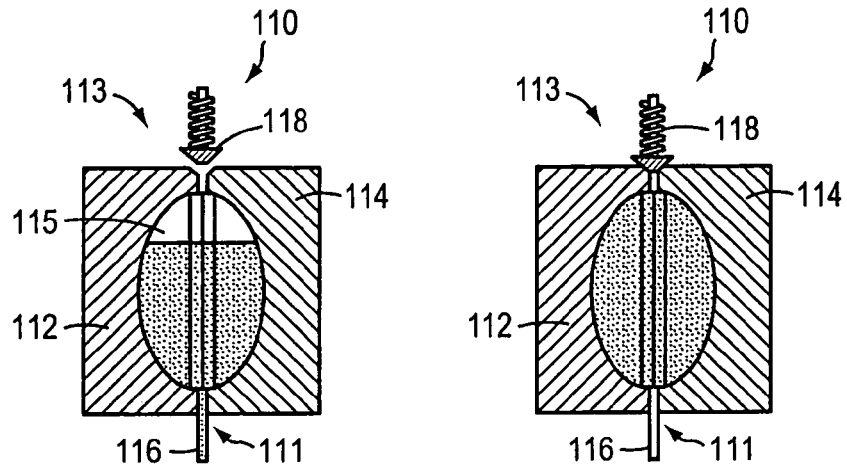
FIG. 6A  FIG. 6B

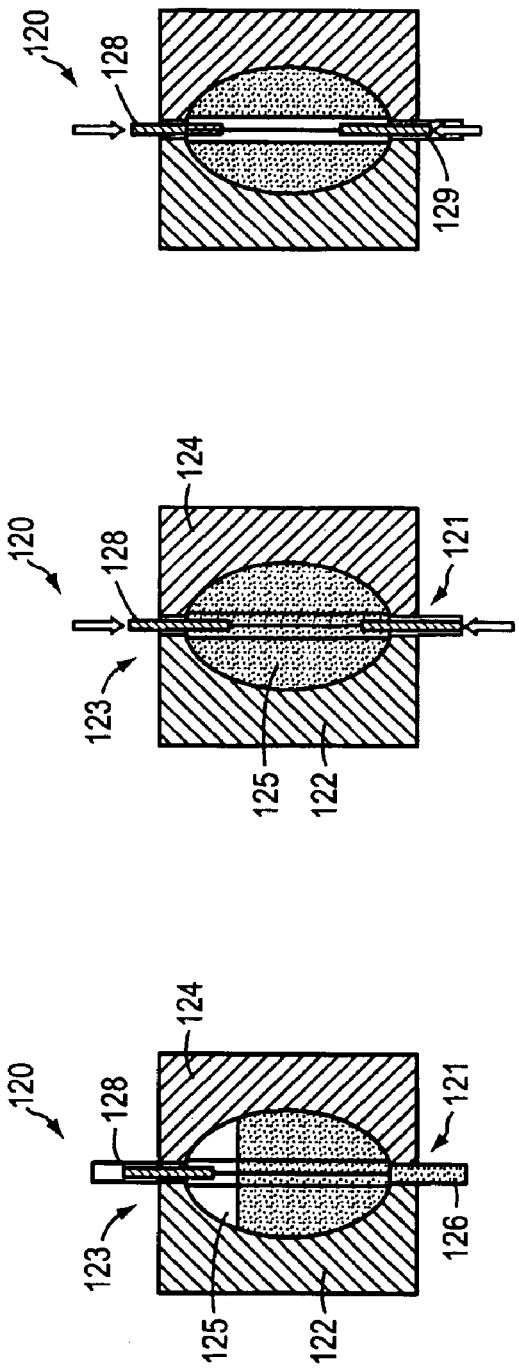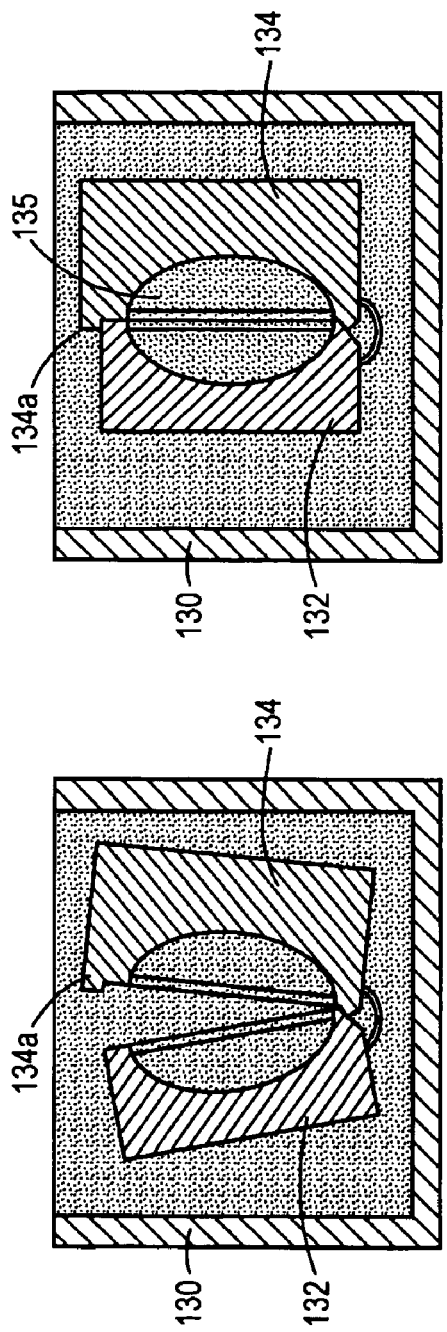

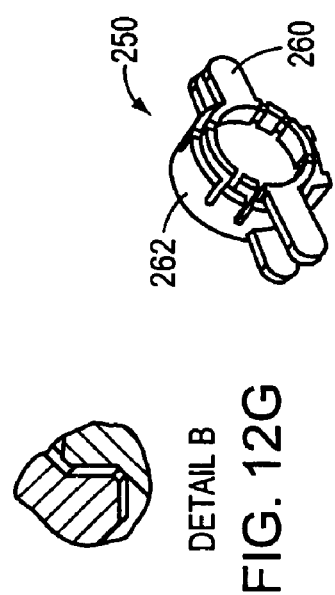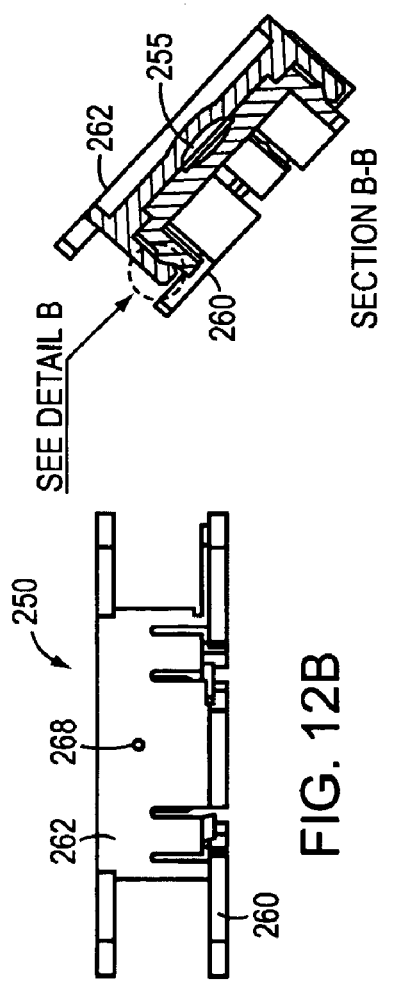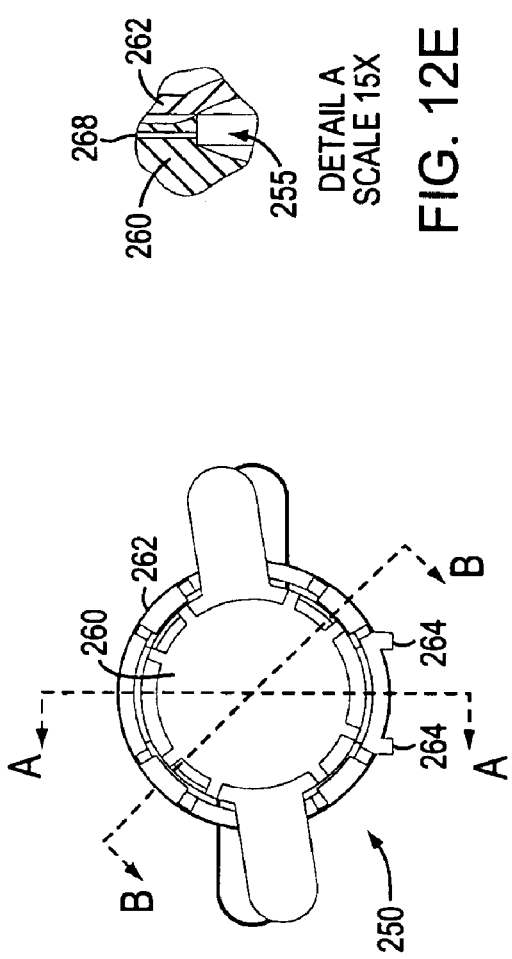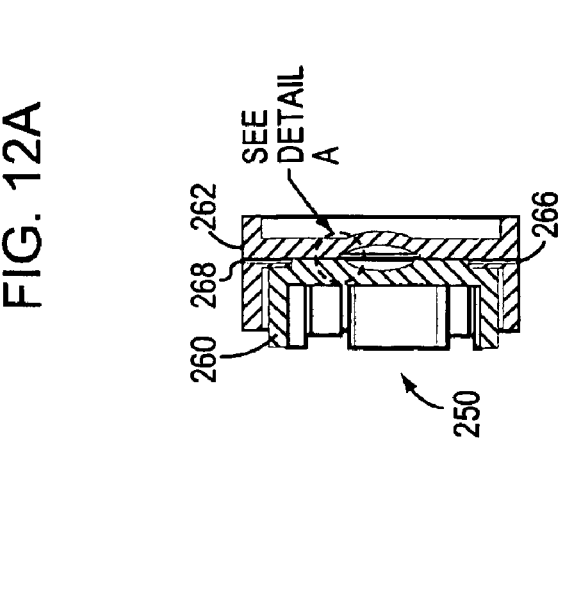

SECTION A-A

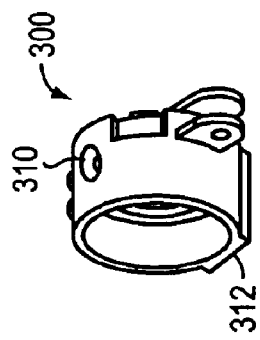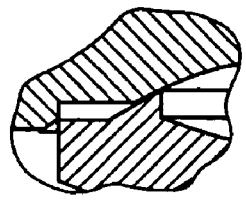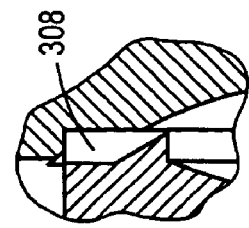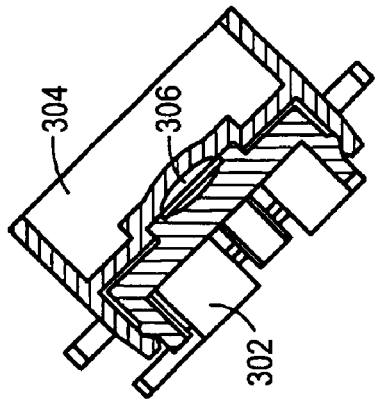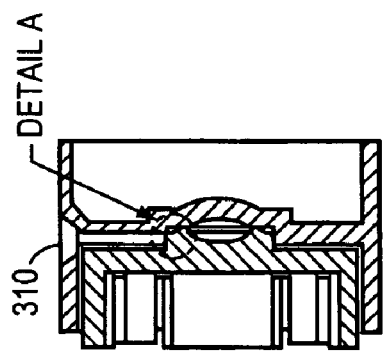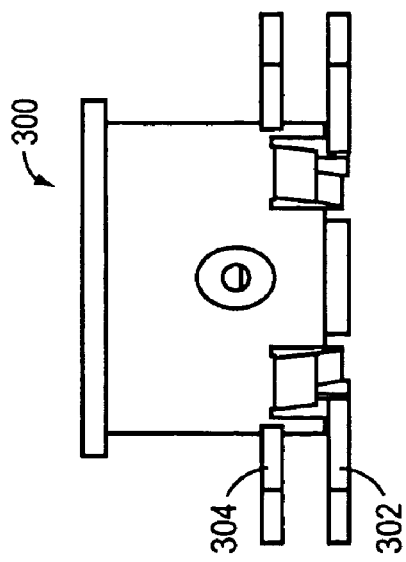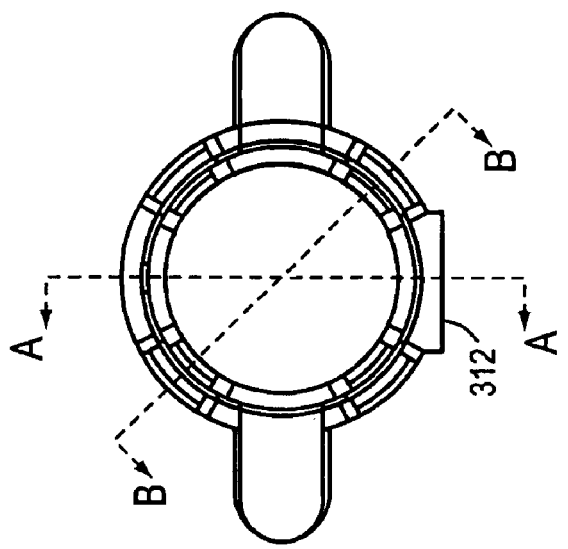

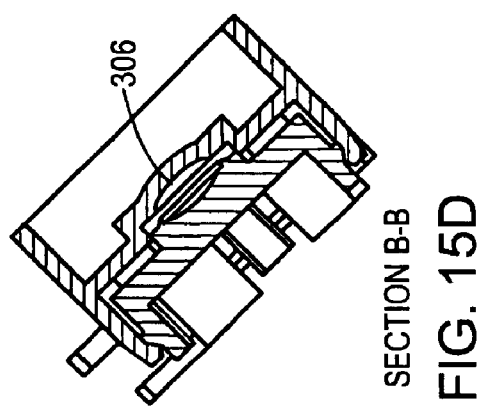
FIG. 15D SECTION B-B
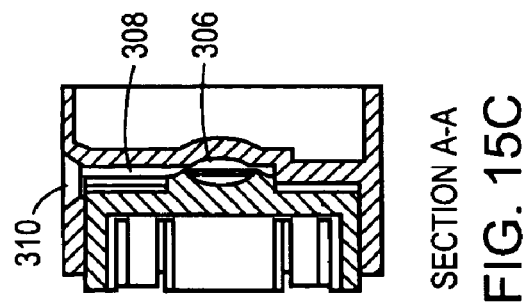
FIG. 15C SECTION A-A
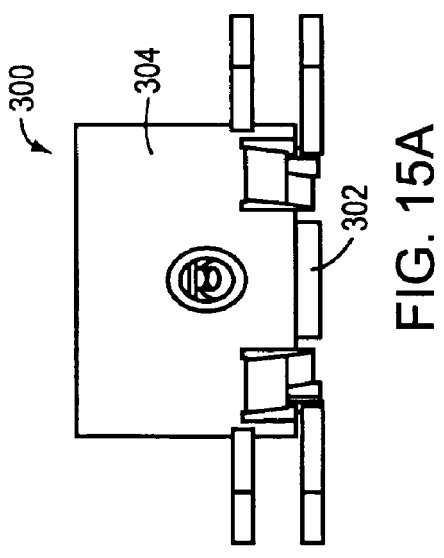
FIG. 15A
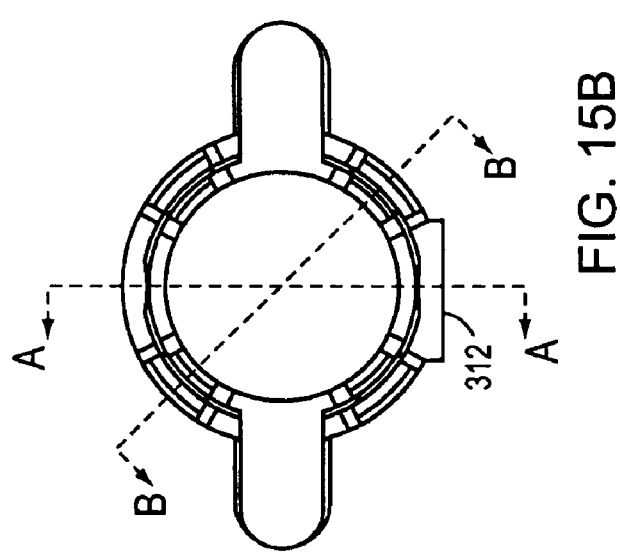
FIG. 15B

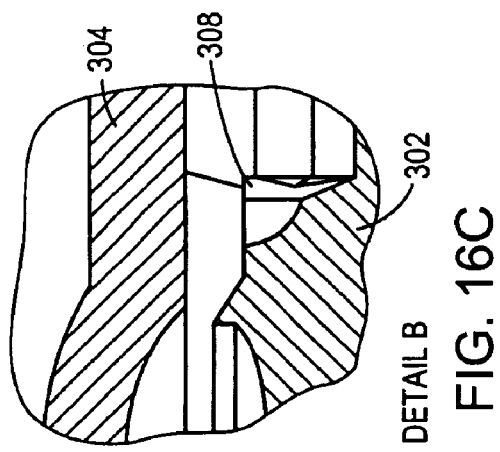
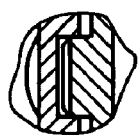
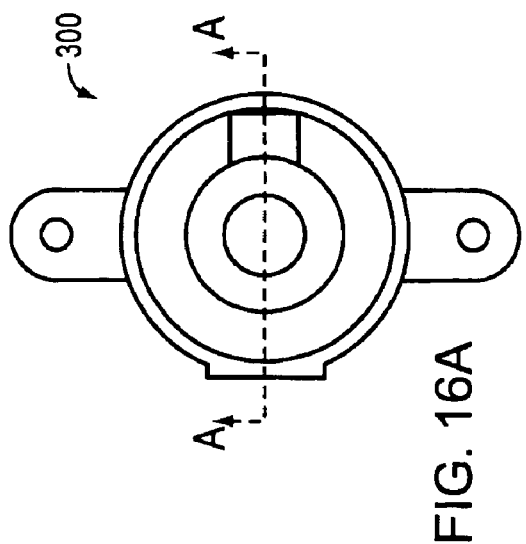
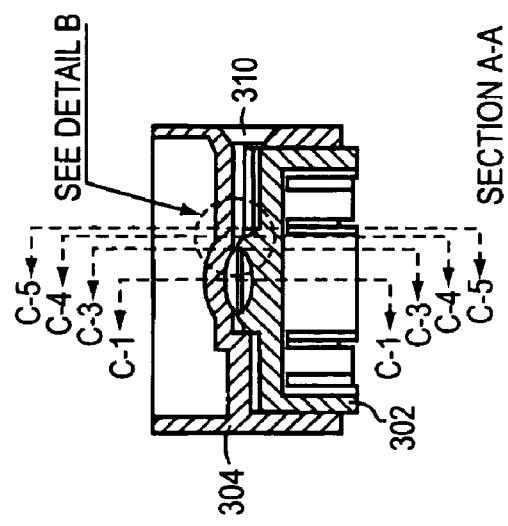

DETAIL A

SECTION C-5-C-5

SECTION C-3-C-3

SECTION C-1-C-1

SECTION A-A

DETAIL A

SECTION B-B

SECTION A-A

DETAIL B

DETAIL B

SECTION B-B

SECTION A-A

SECTION A-A

SECTION A-A

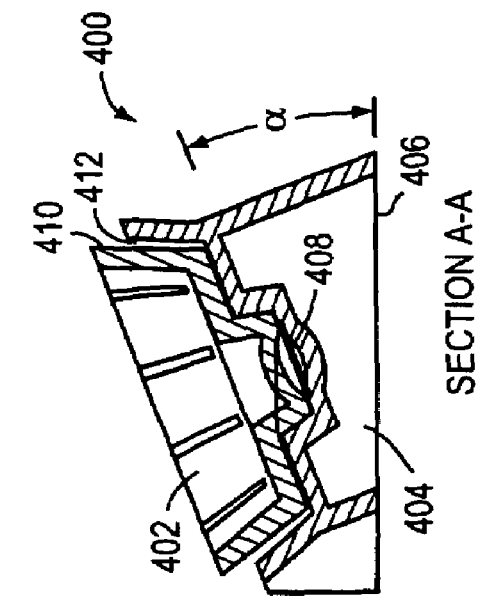
FIG. 22C SECTION A-A
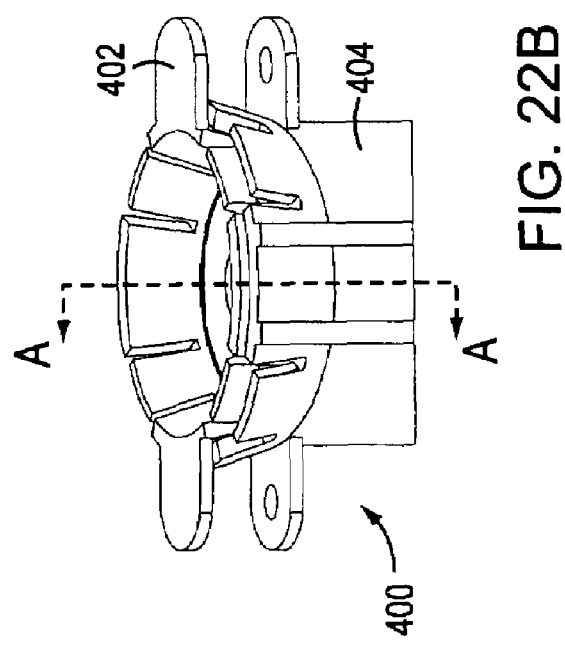
FIG. 22B
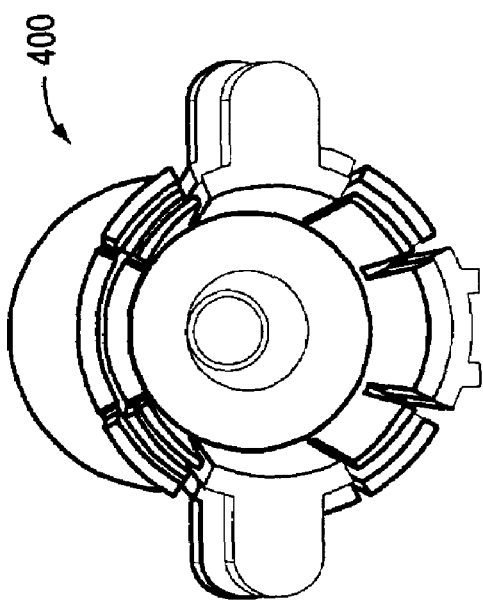
FIG. 22A

DETAIL A

SECTION A-A

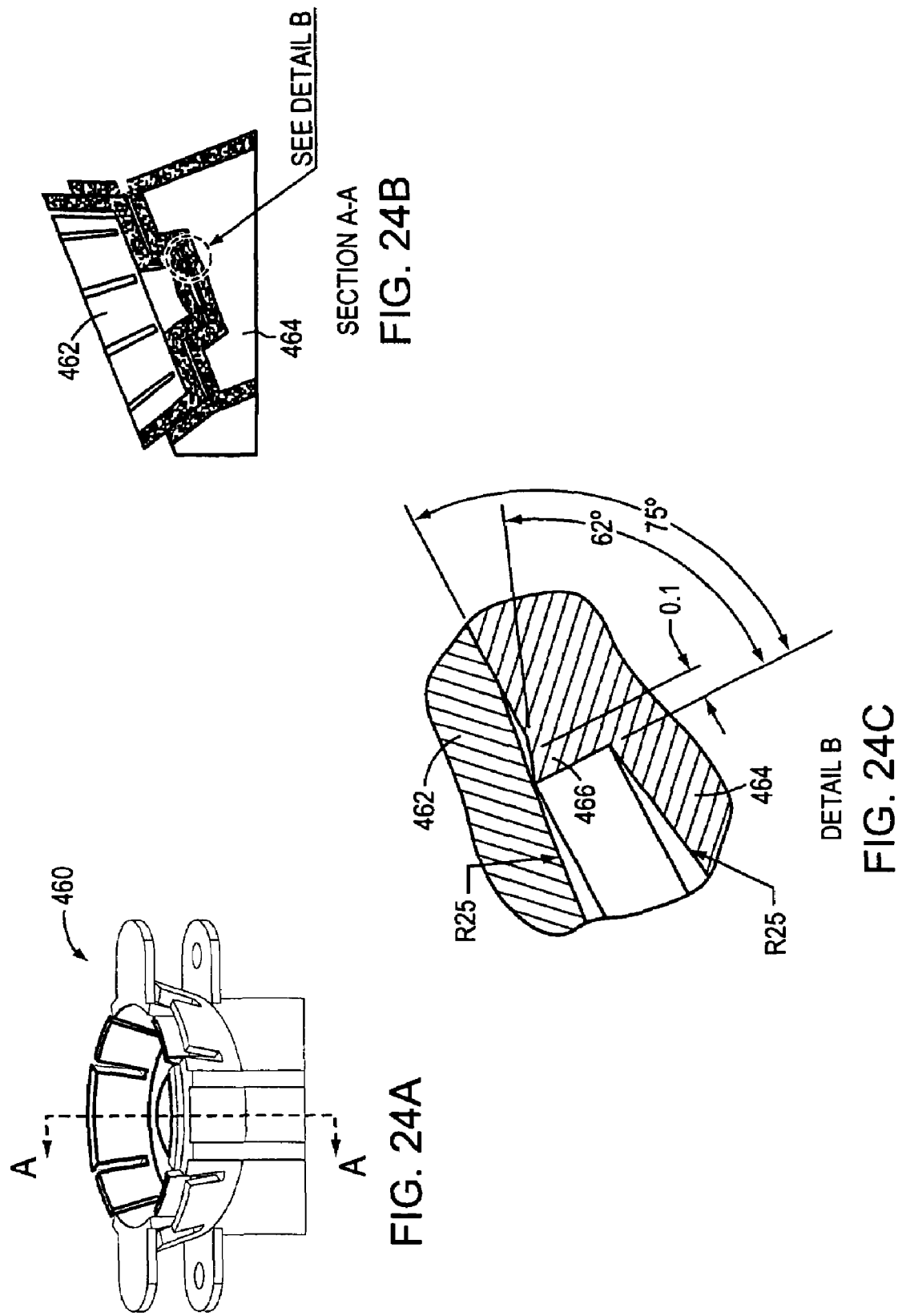

DETAIL B'

DETAIL B"

MOLD AND METHOD FOR CASTING OPHTHALMIC LENSES

CROSS-REFERENCE TO RELATED APPLICATION

This application is a divisional of U.S. patent application Ser. No. 10/098,225, filed Mar. 15, 2002 now U.S. Pat. No. 6,929,233; which claims the benefit of U.S. Provisional Patent Application Ser. Nos. 60/276,787, filed Mar. 16, 2001, and 60/334,752 filed Oct. 31, 2001. U.S. Non-Provisional Patent Application Ser. No. 10/098,225, and U.S. Provisional Patent Application Ser. No. 60/334,752 and 60/276,787 are incorporated herein by reference in their entireties for all purposes.

FIELD OF THE INVENTION

This invention relates broadly to optic and ophthalmic arts. More particularly, this invention relates to ophthalmic molds and methods useful for casting ophthalmic moldings such as intraocular lenses, and to lenses formed using such molds and methods.

BACKGROUND OF THE INVENTION

Artificial intraccular lenses (IOLs), used to replace damaged or diseased natural lenses in the eye, have been widely used in the last two decades. Typically, such intraocular lenses comprise an optical element and one or more haptics coupled thereto for properly positioning and centering the intraocular lens within the eye. These lenses have typically included hard polymeric or glass optical elements with metallic or polymeric supports.

During the past decade, the medical profession has made widespread use of intraocular lenses comprising polymethyl methacrylate (PMMA), a hard plastic composition. In general, PMMA lenses are cut on a precision lathe, using diamond cutters or injection molded, and then carefully post polished by a critical tumbling process in which the edges of the lenses are radiused and polished. Recently, workers in the art have utilized IOLs comprising a soft, biocompatible material, such as silicone. Silicone lenses have the advantage of being lighter in situ than PMMA lenses, and because they are flexible, they can be folded or rolled to reduce their size during implantation into the eye in accordance with conventional surgical procedures.

Methods of producing optical or ophthalmic components, such as IOLs, have not changed in principle in many years. The main requirements are that the optical surface be polished to a highly accurate shape. Currently, most IOLs are manufactured using the time-consuming, expensive, and quality-varying process of lathing. The hand or automated lathing processes for IOLs, as well as the steps currently necessary prior to the lathing process, which include sheet or rod forming, machining, button coring, tumble polishing, extraction, etc., are quite inefficient and require additional machinery for manufacturing the lenses.

Previously known techniques for casting molded concave-convex lenses, such as contact lenses, generally are not well suited for casting convex-convex IOLs. Known casting methods typically employ a male mold half and a female mold half, which interengage to form the mold space. The female mold half is horizontally disposed and upwardly facing. Lens material is deposited in the open female mold half, and the male mold half is pressed into engagement with the female mold half. The lens material is cured, the mold halves are separated, and the lens is removed from the mold. Casting a convex-convex lens requires filling a mold space formed between opposed female mold halves with lens-forming material, which has proven difficult or impossible using previously known techniques. Lens material deposited into the lower mold half typically is insufficient to fill the upper mold half, resulting in a void in the upper portion of the mold space and producing an inferior or defective lens.

Accordingly, there is a need in the art for improved molds and methods for casting ophthalmic lenses, and for lenses formed by such molds and methods.

SUMMARY OF THE INVENTION

The present invention relates to a novel lens molding process suited for double-sided molding (DSM) processes, other molding or casting processes, molds used therein, and ophthalmic moldings or lenses cast from such molds and processes, including convex-convex lenses. The invention is particularly useful for casting intraocular lenses, and in preferred forms decreases the cost of manufacturing and increases end quality and uniformity. The invention is also useful in casting contact lenses and other ophthalmic moldings, including concave-convex lenses and other lens configurations. Typical molds described herein have mold halves that can be joined using varying methods including snap fittings, fixturing (external or internal), and the like.

In one aspect, the present invention is a mold for casting an ophthalmic lens, the mold defining a lens forming cavity having a circumferential edge lying in a plane that is inclined at an angle relative to horizontal.

In another aspect, the invention is a method of casting an ophthalmic lens. The method preferably includes the steps of: providing a mold defining a lens forming cavity having a circumferential edge; positioning the mold with the circumferential edge of the lens forming cavity lying in a plane that is-inclined at an angle relative to horizontal; and delivering lens forming material into the lens forming cavity.

In still another aspect, the invention is a method of casting an ophthalmic lens. The method preferably includes the steps of: at least partially filling a first mold half with lens forming material; at least partially filling a second mold half with lens forming material; and bringing the first and second mold halves into engagement with one another to define a lens forming cavity.

In another aspect, the invention is a mold for casting an ophthalmic molding. The mold preferably includes a first mold half detachably affixed to a second mold half, whereby the mold has a top and a bottom; and a cavity formed by the affixed first and second mold halves, wherein the cavity vents gas and excess lens forming material from an opening at the top of the mold.

In yet another aspect, the invention is a mold apparatus for casting an intraocular lens. The mold apparatus preferably includes a first mold half; a second mold half detachably affixed to the first mold half, whereby the mold has a top and a bottom; and a cavity formed by the affixed first and second mold halves, wherein the cavity receives a lens forming material through an opening at the bottom of the mold and vents gas and excess lens forming material from an opening at the top of the mold. The mold apparatus preferably also includes a first needle for engagement with the opening at the bottom of the mold to deposit lens forming material in the cavity; and a second needle for engagement with the opening at the top of the mold to vent fluid from the cavity.

In another aspect, the invention is a method of casting an ophthalmic lens. The method preferably includes the steps of:

providing a mold cavity within a mold, the cavity defining the ophthalmic lens to be cast; introducing a lens forming material into the, mold cavity; venting fluid through -at least one opening in a top portion of the mold; and curing the lens forming material in the mold cavity to form the lens.

In still another aspect, the invention is a lens formed using one or more of the methods or apparatus described herein.

Additional advantages of the invention will be set forth in part in the drawing figures and detailed description, which follow, and in part will be obvious from the description, or may be learned by practice of the invention. The advantages of the invention will be realized and attained by means of the elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIG. 1A is a cross-sectional view showing a mold apparatus and method according to one preferred form of the present invention.

FIG. 1B is a cross-sectional view of the mold apparatus of FIG. 1A, shown completely filled.

FIG. 2A is a cross-sectional view showing a partially filled and open mold according to another preferred form of the present invention.

FIG. 2B is a cross-sectional view of the mold of FIG. 2A shown closed and completely filled.

FIG. 3A is a cross-sectional view showing another embodiment of a mold apparatus and method of the present invention.

FIG. 3B is a cross-sectional view of the partially filled mold of FIG. 3A.

FIG. 3C is a cross-sectional view of the completely filled mold of FIG. 3A.

FIG. 4A is a cross-sectional view showing another embodiment of a mold of the present invention shown open and partially filled.

FIG. 4B is a cross-sectional view of the closed and completely filled mold of FIG. 4A.

FIG. 5A shows a cross-sectional view of another embodiment of a mold apparatus and method of the present invention, shown prefilled.

FIG. 5B is a cross-sectional view of an intermediate filling and closing sequence of the mold of FIG. 5A.

FIG. 5C is a cross-sectional view of the closed and completely filled mold of FIG. 5A.

FIG. 6A shows a cross-sectional view of another embodiment of a mold apparatus and method of the present invention, partially filled.

FIG. 6B is a cross-sectional view of the completely filled mold of FIG. 6A.

FIG. 7A shows a cross-sectional view of another embodiment of a partially filled mold apparatus and method of the present invention.

FIG. 7B is a cross-sectional view of the open and completely filled mold of FIG. 7A.

FIG. 7C is a cross-sectional schematic view of the closed and completely filled mold of FIG. 7A.

FIG. 8A is a cross-sectional view of another embodiment of a mold apparatus and method of the present invention, shown open and submerged in a tank of prepolymer material.

FIG. 8B is a cross-sectional view of the closed and completely filled mold of FIG. 8A submerged in a tank of prepolymer material.

FIGS. 12A-12G show a molding apparatus according to another form of the present invention.

FIGS. 14A-14G show a molding apparatus according to another form of the present invention.

FIGS. 15A-15D show a molding apparatus according to another form of the present invention.

FIGS. 16A-16G show a molding apparatus according to another form of the present invention.

FIGS. 22A-22G show a molding apparatus according to another form of the present invention.

FIGS. 24A-24E show further details of a molding apparatus according to the present invention.

DETAILED DESCRIPTION OF THE INVENTION

Figure 9C:
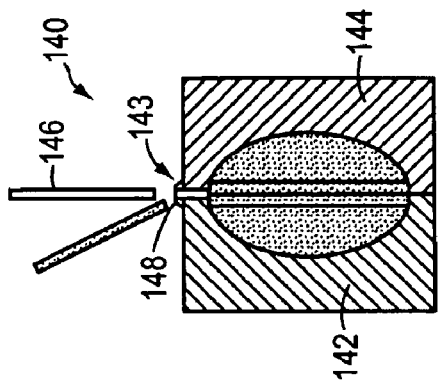
FIG. 9C is a cross-sectional view of the closed and completely filled mold of FIG. 9A.

The present invention may be understood more readily by reference to the following detailed description of the invention taken in connection with the accompanying drawing figures forming a part of this disclosure. It is to be understood that this invention is not limited to the specific molds, methods, conditions and parameters described and/or shown, as specific molds, methods and/or method conditions and parameters for processing and molding polymers and polymer and/or monomer formulations into ophthalmic lenses may, of course, vary. It is also to be understood that the terminology used herein is used for the purpose of describing particular embodiments by way of example only and is not intended to be limiting. It must also be noted that, as used in the specification including the appended claims, the singular forms Aa,@ Aan,@ and Athe@ include plural references unless the context clearly dictates otherwise.

Ranges may be expressed herein as from Aabout@ or Aapproximately@ one particular value and/or to Aabout@ or Aapproximately@ another particular value. When such a range is expressed, another embodiment includes from the one particular value and/or to the other particular value. Similarly, when values are expressed as approximations, by use of the antecedent Aabout,@ it will be understood that the particular value forms another embodiment.

One embodiment of the present invention is a method for casting an ophthalmic molding or lens. The casting method according to the present invention comprises, in its most basic form, the following steps: (1) filling a mold cavity with a lens forming material such as a prepolymer to a level sufficient to produce a lens of a desired geometry, (2) curing the lens forming material within the mold, and (3) extracting the cured lens from the mold. In various example embodiments described in greater detail herein, the filling of the mold cavity involves venting, submersion, and/or other mechanisms for ensuring the mold is filled to the appropriate level. The mold cavity is preferably a concave-concave cavity for forming a convex-convex lens. The two opposed concave surfaces can be symmetric or asymmetric. Other embodiments of the present invention include molds useful with the casting process and ophthalmic moldings or lenses made therefrom.

Although an ophthalmic molding or lens is discussed primarily herein by way of various examples as an intraocular lens, the invention also includes contact lenses for vision-correction (e.g., spherical, toric, bifocal), contact lenses for modification of eye color, ophthalmic drug delivery devices, ocular tissue protective devices (e.g., ophthalmic healing promoting lenses), and other moldings for placement in intimate contact with the eye of a human or animal subject. In addition, although the invention is described herein primarily with regard to certain example embodiments for the casting of convex-convex lenses, the present invention also includes methods and molds for casting concave-convex, concave-concave, planar-convex, planar-concave, planar-planar, and other molding geometries, as well as moldings cast using said methods and molds.

In preferred form, a tens or other molding is formed according to the present invention from a polymer precursor or prepolymer, such as a cross-linkable or polymerizable material suitable for casting and forming an ophthalmic molding or lens, such as an intraocular lens. Typically, the prepolymer is a monomer, a polymer, or a polyvinyl alcohol (PVA) hydrogel. The ophthalmic molding or lens of this invention may be manufactured, generally, by thoroughly mixing the polymerizable material including the polymer precursor (and any comonomers), applying an appropriate amount of the material to a lens mold cavity in accordance with the methods and molds of this invention, and initiating polymerization. The resulting molding or lens may be extracted from the mold by conventional methods.

In a preferred form, the molding or lens is formed from a flexible, transparent polymeric material such as, for example, modified poly(methyl methacrylate) (PMMA), modified PMMA hydrogels, hydroxy-ethyl methacrylate (HEMA), PVA hydrogels, silicone, or other polymeric materials. In a particularly preferred embodiment, the lens is formed from a shape-memory material such as is disclosed by U.S. Pat. No. 4,731,079, which is hereby incorporated by reference. Such a lens is optionally chilled in a rolled configuration and, upon exposure to body temperature during implantation, returns under its own influence (Ashape memory@) to an unrolled configuration. The haptics of an intraocular lens are preferably flexible filaments formed of polypropylene or other suitable materials.

Photoinitiators, are preferably added to the polymer precursor to aid in initiating polymerization. Polymerization may be initiated by a number of well known techniques, which, depending on the polymerizable material, may include application of radiation such as microwave, thermal, e-beam and/or ultraviolet. Preferred methods of initiating polymerization include application of ultraviolet and/or thermal radiation. Prepolymer can be introduced into a mold by metering in of material, for example, by means of dropwise introduction. The polymerization or cross-linking can be effected in a very short time, for example, in less than 60 minutes, preferably less than 20 minutes, and more preferably less than 10 minutes. Alternate curing processes may take more than 60 minutes, for example, up to several days. Opening the mold to remove the resulting molding can be carried out in a conventional manner.

Suitable molds or mold halves according to this invention are manufactured from disposable or recyclable plastic polymeric materials (e.g., polypropylene or polystyrene), and more preferably from such materials which transmit light, heat and/or radiation of a chosen wavelength sufficient to cross-link or polymerize the polymer precursor. Plastic mold materials are preferably relatively thermally and chemically stable to avoid deformation or damage during casting and curing. Alternatively, molds are manufactured from materials such as glass, quartz, sapphire, metals or other substantially rigid material(s) of construction.

According to an example embodiment of the present invention, a double-sided molding (DSM) method and mold are utilized to cast ophthalmic lenses. In particular, DSM methods and molds according to this invention typically utilize a first mold half having an inner concave (also referred to as a Afemale@ or Afront@) surface, which corresponds to and detachably affixes to a second mold half also having an inner concave (Afemale@ or Afront@) surface. When the first mold half is. affixed to the second mold half, a lens forming cavity is formed that defines the outer contours of a lens body and its surface(s), for example a biconvex (convex-convex) intraocular lens body and surface(s). Liquid monomer or a polymer precursor mixture is dispensed into the cavity and excess prepolymer and gas contained in the mold cavity is vented through at least one opening formed when the first mold half is affixed to the second mold half. Light (e.g., UV) or heat is applied to initiate polymerization or cross-linking and form a solid lens.

Example embodiments of preferred forms of the present invention will now be described with reference to the drawing figures, wherein like numerals in the various figures are employed to designate like parts. In the mold apparatus 20 of FIGS. 1A and 1B, a cavity 35 is formed by first and second mold halves 30 and 32. Each mold half preferably defines an inner surface corresponding to a portion of the desired external geometry of the lens or other molding to be formed therein. In the depicted embodiment, each mold half defines a concave inner face having a generally circular rim forming a circumferential edge of the lens forming cavity, and a spherical section profile for forming a convex-convex IOL. The inner surfaces of the mold halves are preferably polished to a very smooth finish, and may be formed of and/or treated with a non-stick material to facilitate de-molding. The mold halves 30 and 32 are preferably plastic and are preferably held together by a pressure fit, by one or more snaps or other retainers (not shown) attached to or integrally formed with the mold halves, or by internal or external fixturing, such as a mold tray or external support. The walls of the mold halves are preferably sufficiently thick to prevent significant deformation during filling and curing. The mold cavity 35 is filled with prepolymer 55 from a bottom opening 36, as through a fill needle 40, and vented from a top opening 38. The cavity 35 can be vented through a vent needle 42 installed in the top opening 38, which is open to the atmosphere or connected to a vacuum source such as a low pressure plenum. As shown in FIG. 18, needles 40 and 42 can be extended into the mold cavity 35 through openings 36 and 38 before or during filling, or after the cavity 35 is filled. After at least partially curing the lens forming material, the needles are removed to form bores in the lens material that will accept haptics in a later assembly stage of an intraocular lens. Needles 40 and 42 can be filled with a solid mandrel, a liquid or a gas when inserted into cavity 35 to form the haptic bores. Alternatively, solid pins or other bodies are used in place of the needles 40, 42 during the haptic bore forming step. Orientation of the mold with a diametrical axis (i.e., an axis extending along a diameter of the lens forming cavity, between two points on the cavity=s circumferential edge or rim) of the mold cavity 35 positioned generally vertically as depicted, or alternatively with the circumferential edge of the lens forming cavity lying at a plane that is inclined at an acute angle from horizontal, allows the mold cavity to be filled substantially completely by venting through an opening 38 at or adjacent the top of the mold cavity. The angle of inclination of the plane of the lens forming cavity from horizontal is preferably between about 5E to about 90E, and more preferably between about 20E to about 90E. Alignment of the haptic-to-haptic axis of the lens forming cavity of the mold with the bottom and top openings 36, 38 allows use of the fill and vent needles 40, 42 in the formation of haptic bores.

In an alternate embodiment of the invention depicted in FIGS. 2A and 2B, the mold 50 defines a cavity 65 formed by two mold halves 60 and 62, which is filled with lens forming material 55 through an opening 66 at the bottom and vented from an opening 68 at the top of the mold. As compared to the embodiment of FIG. 1, the mold of FIG. 2 is designed so that mold half 62 overlaps and slideably or nestingly interengages with mold half 60 in an axial direction. In this manner, the mold halves 60, 62 are axially movable between an open position for de-molding of the lens and cleaning or treating the mold surfaces, and a closed position for filling the mold and curing the lens. The mold halves 60, 62 may include cooperating snap fittings or other couplings for releasably retaining the mold halves together in the closed position. The couplings preferably resist axial movement of the mold halves relative to one another when coupled, but permit rotation of one mold half relative to the other. Each mold half 60, 62 includes an inlet hole and a vent hole that align when the mold halves are closed and rotated relative to one another into a Afill@ position, such that the fill hole 66 and venting hole 68 are open to receive lens-forming material and vent the cavity 65, respectively (FIG. 2A). After filling, the closed mold halves 60 and 62 are rotated relative to one another into a Asealed@ position, wherein the inlet and vent hole of the mold halves are not aligned, and the fill hole 66 and vent hole 68 are thereby blocked (FIG. 2B). Typically, the curing stage is initiated when the mold halves are in the sealed position. The mold 50 optionally is connected to or formed as part of a mold transport mechanism, such as a hydraulic, pneumatic, mechanical and/or motor-driven actuator, for moving the mold halves 60, 62 axially relative to one another between the open and closed positions, and for rotating the mold halves.

In an alternate embodiment depicted in FIGS. 3A, 3B, and 3C, a mold apparatus 80 having a cavity 75 formed by two mold halves 70 and 72 held together by one or more snaps, retainers or fixturing (not shown) is filled with prepolymer 55 through an opening at the bottom (shown generally at 76) and vented from an opening at the top (shown generally at 78). The filling is preferably accomplished by a fill needle 77 and venting is accomplished via a pressure relief valve 79, both of which are preferably reusable in the process. Prior to filling cavity 75 with prepolymer, as shown in FIG. 3A, the mold is preferably set up in a tray or other fixture. The fill port or opening 76 is blocked by a valve 74 held in a normally closed position by one or more springs. For filling, fill needle 77 engages valve 74, pushes valve 74 open and begins to deposit prepolymer 55 into cavity 75 (FIG. 3B). The fill needle 77 and the valve 74 preferably comprise cooperating articulation surfaces, such as inclined or curved faces, for opening the valve. As prepolymer 55 is deposited into cavity 75, gas pressure within the cavity opens pressure relief valve 79 to vent gas from the cavity 75. After cavity 75 is filled with prepolymer, needle 77 is retracted and valve 74 and vent valve 79 returns to its normally closed position (FIG. 3C).

FIGS. 4A and 4B show another embodiment of a mold 90 according to the present invention. FIG. 4A shows mold 90 open and partially filled with prepolymer material. A cavity 95 is formed by two mold halves 92 and 94 and is filled from the bottom to the top from a reservoir (not shown) through an opening 96 at the top 98 of the mold. The mold halves 92, 94 slidably engage one another, and move relative to one another between a first or open position for filling and venting and a second or closed position for curing. The cavity 35 is vented from the top opening 96 during filling. Additionally, the top 98 of the mold contains a built-in overflow chamber or area 99 for containing excess monomer or prepolymer that may overflow as the mold is closed. FIG. 4B shows the mold 90 in a closed position after prepolymer or monomer 55 fills cavity 95. A small amount of excess prepolymer material may remain in an ancillary small chamber 97 within the mold 90 once mold halves 92 and 94 engage and close the mold, to ensure complete filling of the mold chamber.

FIGS. 5A, 5B, 5C illustrate a mold 100 and molding sequence according to another embodiment of this invention. In FIGS. 5A, 5B, and 5C, a cavity 106 formed by two mold halves 102 and 104 is filled from the bottom and the top simultaneously. Mold halves 102 and 104 are each at least partially filled with lens forming material prior to engaging the mold halves together (FIG. 5A). The mold halves 102, 104 are then brought into engagement with one another, causing the lens forming material in the two mold halves to combine and integrate into a single mass (FIG. 5B). As the mold halves are brought together into their closed position (FIG. 5C), the lens forming material fills the cavity 106 allowing air and excess lens forming material to escape between the mold halves. The mold halves can be horizontally arranged, as shown, in which case the lens forming material placed in the downward facing mold half 102 adheres to the mold by surface tension. Alternatively, the mold halves are vertically arranged, or are arranged at an oblique angle, and lens forming material is maintained in each mold half by surface tension.

FIGS. 6A and 6B show still another embodiment of the present invention. A cavity 115 formed between two mold halves 112 and 114 is filled through a bottom opening 111, and is vented from a top opening 113. Lens forming material is delivered to the mold via a fill needle 116 that engages the bottom opening 111. The fill needle is preferably reusable in multiple molding sequences, and is connected to a pressurized delivery system for delivery of the lens forming material. In preferred form, the lens forming material will pass through the opening 111 only under pressure, thereby preventing release of lens forming material after the cavity has been filled. Venting takes place through a pressure relief valve 118 in communication with the top opening 113. The pressure relief valve 118 preferably comprises a plunger or other contact element biased into contact by a spring or other biasing element, whereby application of sufficient pressure to the contact element through the top opening 113 disengages the contact element from the opening to allow fluid to escape from the cavity 115. The pressure relief valve can be integrally formed with the mold, or can comprise a separate component. Any flash that may form on the lens at the inlet and outlet holes of the mold can be removed from the finished ophthalmic lens by finishing techniques such as tumbling or drilling.

FIGS. 7A-7C illustrate another embodiment of a mold apparatus and molding method according to the present invention. A mold apparatus 120 comprising two mold halves 122 and 124 defines a cavity 125 for forming a lens. The cavity 125 is filled with lens forming material from the bottom 121 and vented from the top 123. Filling is preferably accomplished through a needle 126. A slug or mandrel 128, such as a plastic rod or filament, is preferably disposed within the vent opening 123 during filling. When the lens is cured, the slug 128 is removed to form a hole for receiving a haptic. Alternatively, the slug 128 comprises one end of a haptic filament to be molded into the lens. The vent opening preferably is sufficiently large to permit fluid to escape around the slug 128 during filling. Once filling is complete, a second slug 129 is preferably inserted through the fill opening 121 to form a second haptic bore. In a further preferred form of the invention, one or both of the slugs 128, 129 comprise a flared or expanded portion for engaging a cooperating surface of the mold to close the vent and/or fill port upon insertion.

Another embodiment of a mold and method according to the present invention is shown in FIGS. 8A and 8B. In this embodiment, a cavity 135 formed by two mold halves 132 and 134 is filled by at least partially immersing the open mold in a tank 130 filled with the desired lens forming monomer or prepolymer material. The mold halves 132, 134 are preferably hingedly connected to one another, and/or one or both of the mold halves comprise alignment features 134a that allow the mold to be properly closed while submerged in the lens forming material to fill the entirety of the mold cavity 135. Once the mold is filled and closed, it is removed from the tank 130. The mold can be placed in the tank 130 and retrieved by a Apick and place@ type mechanism that transports the mold between adjacent processing stations. At least a portion of the mold halves comprising the lens forming cavity are preferably submerged in tank 130 to ensure that the surfaces of mold halves 132 and 134 are pre-wetted and filled, and the mold halves 132 and 134 are snapped together. In this manner, a Afilling@ hole or opening in the mold is unnecessary.

Figure 9B:
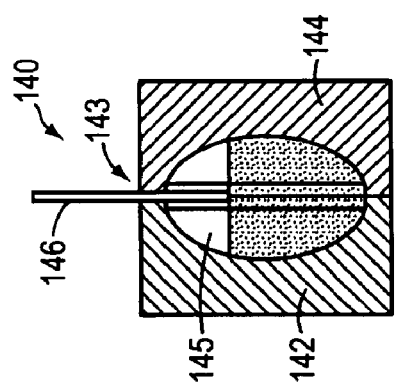
FIG. 9B is a cross-sectional view of an intermediate filling sequence of the open and partially filled mold of FIG. 9A.
Figure 9A:
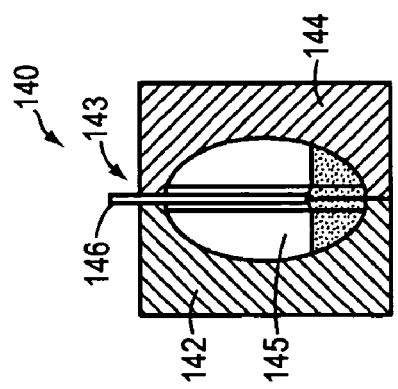
FIG. 9A is a cross-sectional view of another embodiment of a partially filled mold apparatus and method of the present invention.

FIGS. 9A-9C show a mold apparatus and method of filling and venting a lens forming mold according to yet another form of the present invention. A cavity 145 formed by two plastic mold halves 142 and 144 is filled and vented through a top opening 143 of the mold assembly 140. Lens forming material is delivered into the cavity through a fill needle 146. The needle=s outside diameter is substantially smaller than the top opening 143, so that venting can occur through a gap between the needle and the mold around the needle=s perimeter. The needle 146 is either inserted through the top opening into the closed mold, or the mold halves are closed around the needle 146 already in place. In preferred form, as lens forming material is deposited into cavity 145, the fill needle 146 is raised upward through the top opening 143 (FIG. 9B) and eventually removed from the cavity 145 as the cavity is fully filled (FIG. 9C). Once the mold is filled, the fill hole is preferably capped with wax or some other non-reacting compound 148 (FIG. 9C), or is capped by a mechanical plug within the mold tray.

Figure 10C:
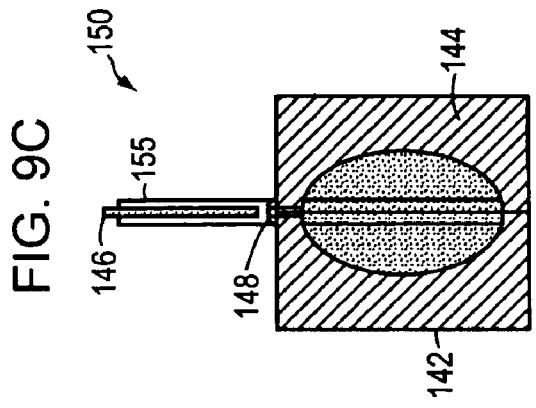
FIG. 10C is a cross-sectional view of the closed and completely filled mold of FIG. 10A.
Figure 10B:
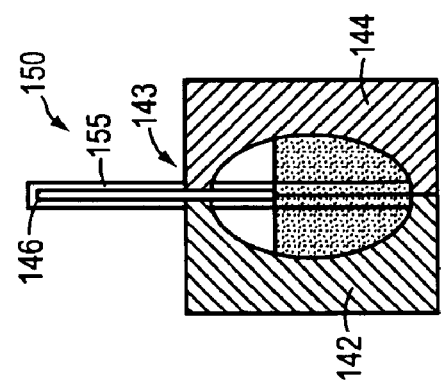
FIG. 10B is a cross-sectional view of an intermediate filling sequence of the open and partially filled mold of FIG. 10A.
Figure 10A:
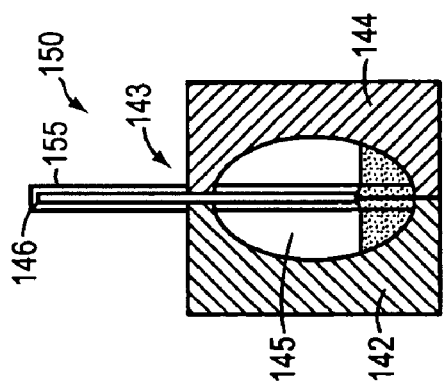
FIG. 10A is a cross-sectional view of another embodiment of a mold apparatus and method of the present invention, shown partially filled.

In another form of the invention, the mold apparatus 150 of FIGS. 10A-10C is filled in a similar manner to that described above with reference to FIGS. 9A-9C. Additionally, a vacuum line 155 is applied over or adjacent the fill needle 146 in communication with the opening 143 to evacuate/vent the mold cavity during filling. The strength of the vacuum and/or the diameter of the fill hole and the needle can be varied depending on, inter alia, the process conditions, lens volume, and the viscosity of the fluid.

Figure 11A:
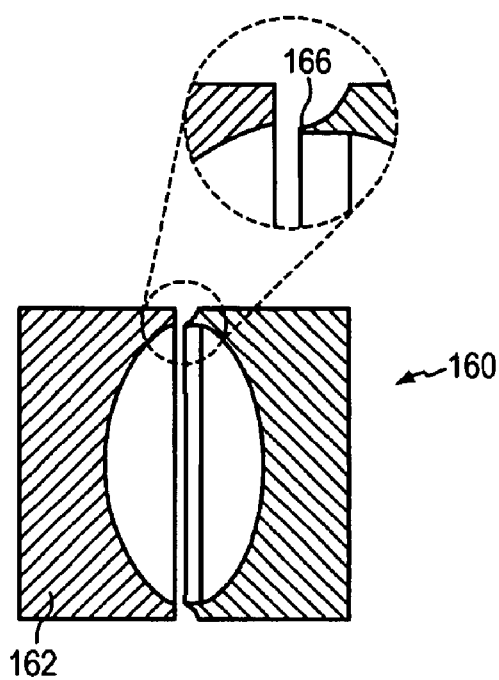
FIG. 11A is a cross-sectional view, including edge details, of another embodiment of a mold of the present invention, shown open.
Figure 11B:
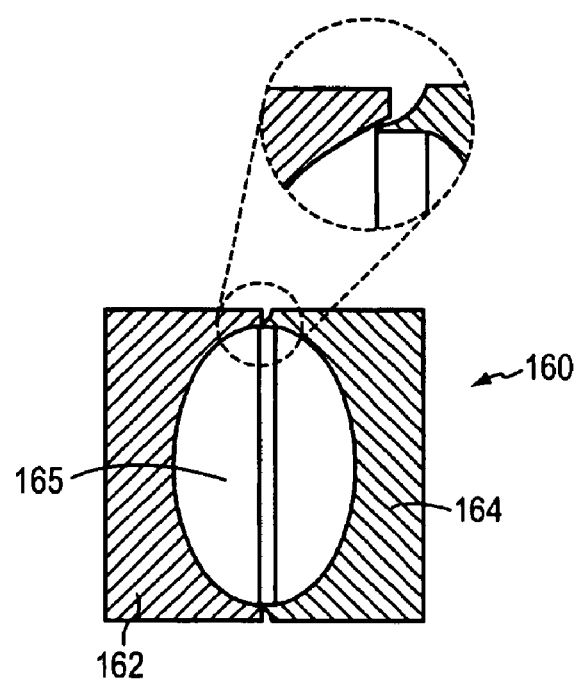
FIG. 11B is a cross-sectional view of the mold of FIG. 11A, shown closed.
Figure 13A:
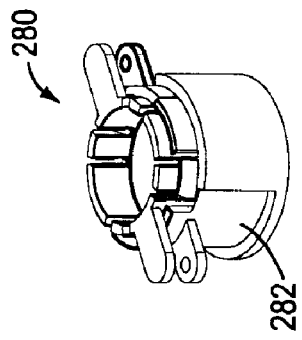
FIGS. 13A-13D show a molding apparatus according to another form of the present invention.
Figure 13D:
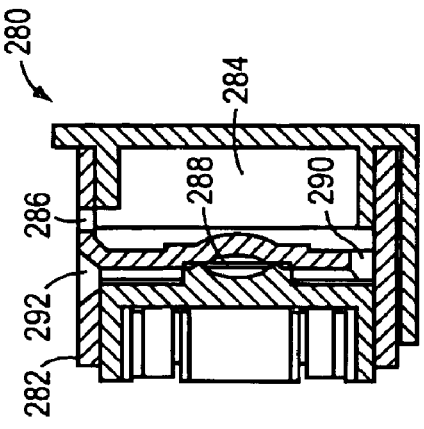
Figure 13B:
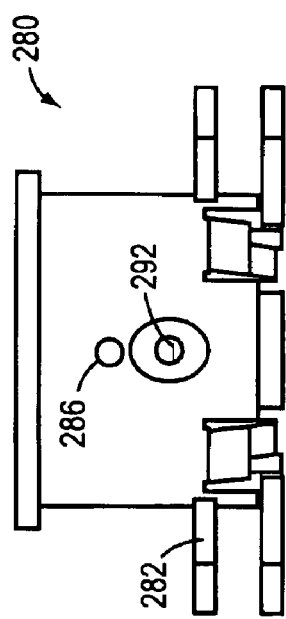
Figure 13C:
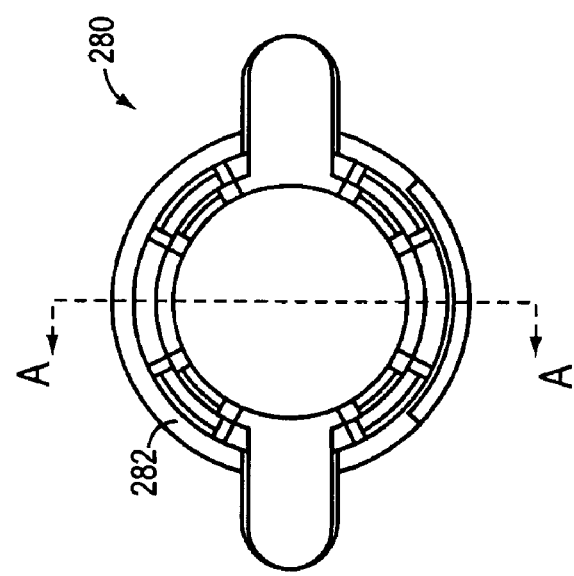
Figure 17C:
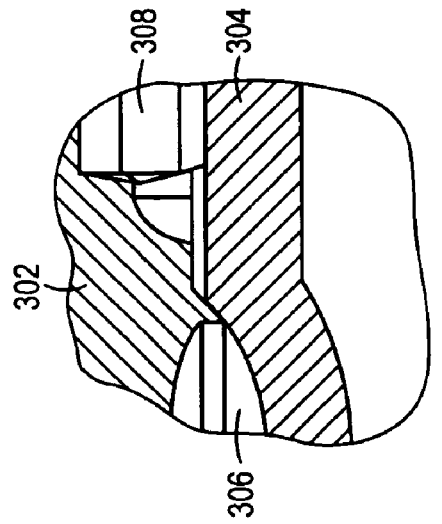
FIGS. 17A-17F show a molding apparatus according to another form of the present invention.
Figure 17F:
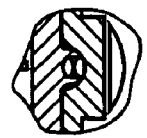
Figure 17E:
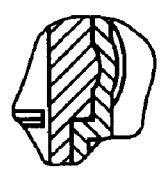
Figure 17D:
Figure 17A:
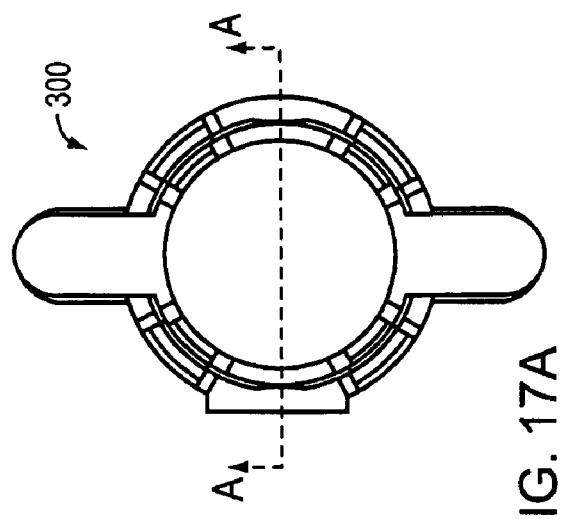
Figure 17B:
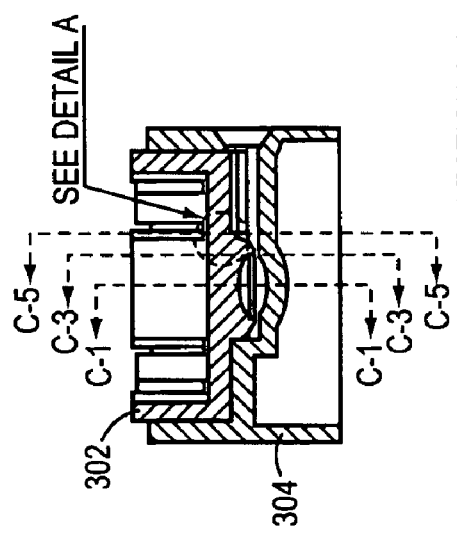
Figure 18A:
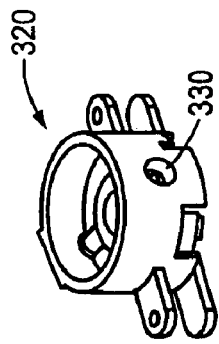
FIGS. 18A-18G show a molding apparatus according to another form of the present invention.
Figure 18E:
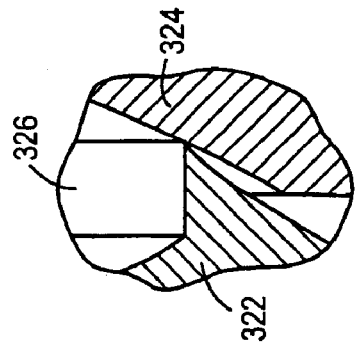
Figure 18F:
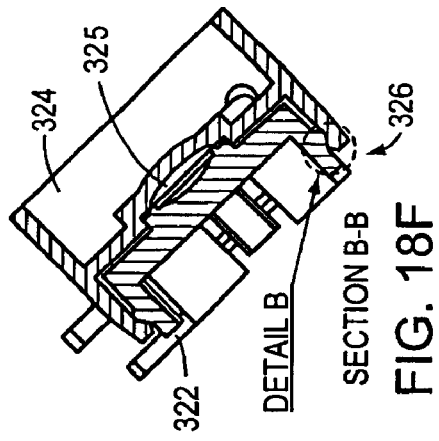
Figure 18D:
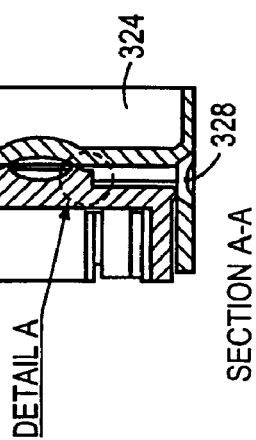
Figure 18G:
Figure 18B:
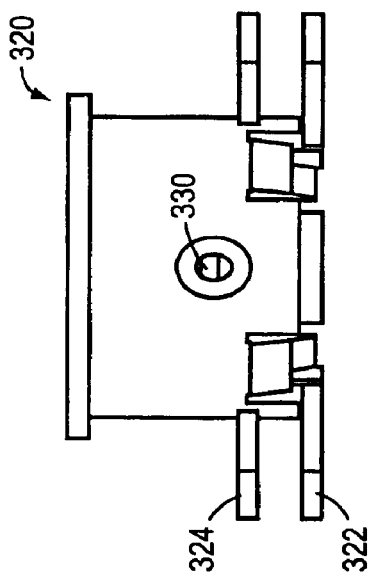
Figure 18C:
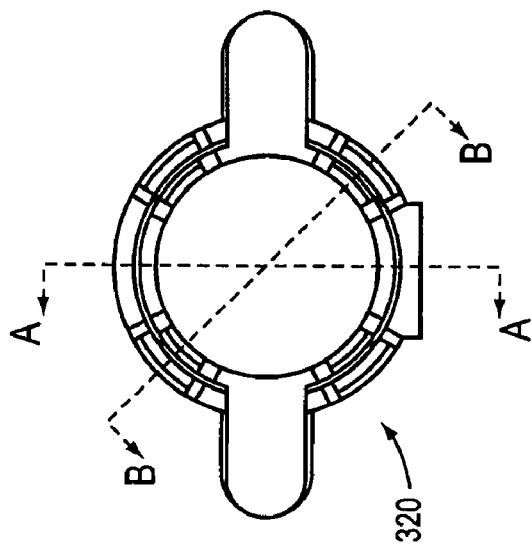
Figure 19A:
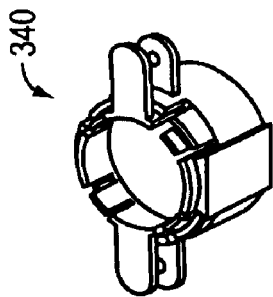
FIGS. 19A-19F show a molding apparatus according to another form of the present invention.
Figure 19F:
Figure 19E:
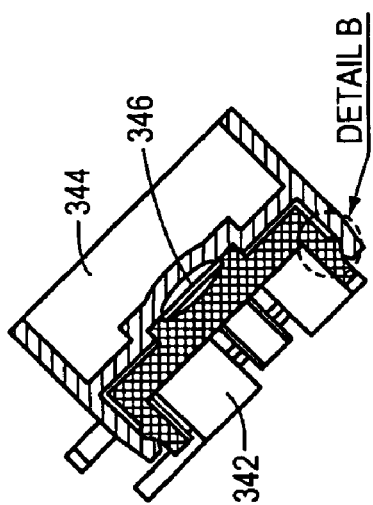
Figure 19D:
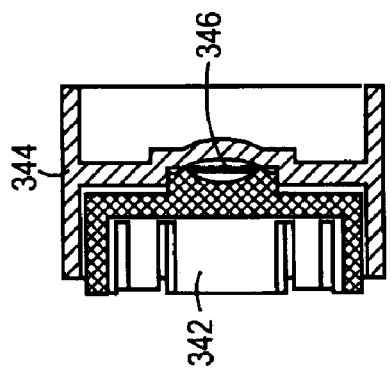
Figure 19B:
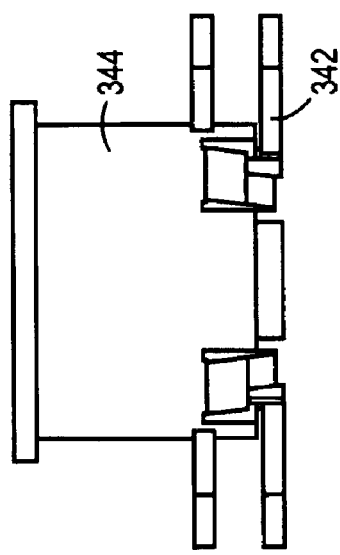
Figure 19C:
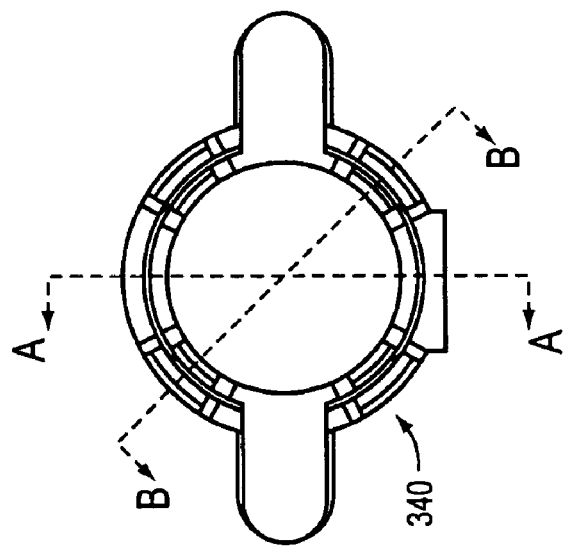

FIGS. 11A and 11B show an edge feature of the mold 160 according to another aspect of the present invention. The mold 160 comprises a first mold half 162 and a second mold half 164, together defining a lens forming cavity 165. One of the first or second mold halves 162, 164 comprises a knife-edge rim 166 surrounding its concave lens forming inner surface. The sharp corner of the knife edge 166 is preferably formed at approximately a 25E angle. While a specific angle measurement is presented by way of example of the mold=s knife edge design, one of ordinary skill in the art will recognize that other designs and angles are possible, most preferably within a range of about 8E-45E. The inner face of the mold half 164 in the vicinity of the knife edge 166 preferably defines a right cylindrical surface for molding a lens having an unobstructed right cylinder rim or edge wall of a desired thickness around the circumference of the lens. The outer face of the mold half 164 in the vicinity of the knife edge 166 preferably defines an angled lip or a radius that is substantially smaller than the radius of the concave lens forming inner surface of the other mold half 162, whereby the knife edge 166 on one mold half 164 sealingly contacts the lens forming inner surface of the other mold half 162. Provision of a knife edge seal and mold configuration between the mold halves in this manner allows sealing contact between the rim of the knife edge 166 and the inner surface of mold half 162. In preferred form, the inner surface of mold half 162 is generally spherical (i.e., having a surface geometry corresponding to a portion of a sphere) and the rim of the knife edge 166 is generally circular, thereby generating a consistent ring of contact therebetween and a consistent geometry of the lens forming cavity 165, regardless of variation in the angular alignment of the mold halves. In this manner, the need for close tolerance control and precise alignment of the mold halves 162, 164 is eliminated. Provision of a knife edge seal also enables improved dimensional control of the final lens product, smoother closure and opening of the mold, and/or more reliable seal integrity when used in combination with any of the various casting methods and apparatus described herein.

FIG. 12 shows further details of one example embodiment of a mold apparatus 250 of the present invention, for casting a lens substantially according to the method described above with regard to FIGS. 2A and 2B. The mold apparatus 250 comprises a first mold half 260 and a second mold half 262. Mold half 260 comprises a cylindrical body having an outer diameter adapted to be slidably engaged within a cooperating inner cylindrical diameter of mold half 262. Each mold half is optionally provided with one or more tabs projecting outwardly therefrom for facilitating manipulation of the mold halves. Confronting surfaces of the first and second mold halves 260, 262 define a lens forming cavity 255. In preferred form, and as seen best with reference to FIG. 12E, one of the mold halves defines the right cylindrical edge and one curved lens face of the mold forming cavity 255, and the other mold half defines the second curved lens face of the mold forming cavity. The interface between the first and second mold halves 260, 262 preferably defines a knife-edge contact feature, substantially as described above. The second mold half 262 optionally comprises one or more feet or base elements 264 for supporting the mold in an upright or other desired configuration. At least one of the mold halves 260, 262 define an inlet passage 266 for receiving lens forming material and communicating the lens forming material to the lens forming cavity 255, and a vent passage 268 for venting air from the the cavity. In preferred form, the inlet passage 266 and the vent passage 268 extend through both mold halves 260, 262, and the mold halves are movable between a fill position where the passages are aligned for receiving lens forming material and venting, and a sealed position where the passages are blocked for curing the lens forming material to form a lens, substantially as described above with reference to FIGS. 2A, 2B. In the aligned position, the vent passage 268 is preferably vertically above the inlet passage, and most preferably the vent passage is at or adjacent the top of the lens forming cavity 255. As seen best with reference to FIGS. 12F and 12G, the first and second mold halves preferably comprise interengaging surface features such as snap fittings or other retaining means for holding the mold halves together for filling and curing. One or more mold assemblies 250 can be permanently or releasably mounted to a carrier tray or other fixture for all or a portion of the lens fabrication process.

FIG. 13 shows further details of another embodiment of a mold apparatus 280 for casting a lens substantially according to the method described above with regard to FIGS. 2A and 2B. One half 282 of the mold 280 includes a reservoir 284. In a first manner of use, a quantity of lens forming material is delivered to the reservoir 284 through an inlet 286, and is subsequently transferred from the reservoir to the lens forming cavity 288 via a conduit 290 through or between the mold halves. A vent passage 292 allows gas to escape from the lens forming cavity during filling. In a second or reverse manner of use, lens forming material is delivered to the lens forming cavity 288 through inlet passage 292, and excess lens forming material overflows through the conduit 290 into the reservoir 284, which is vented via opening 286.

FIGS. 14-17 show additional embodiments of a mold apparatus 300 for casting a lens substantially according to the method described above with regard to FIGS. 4A and 4B. A first mold half 302 is slidingly engaged within a second mold half 304, and a lens forming cavity 306 is defined between confronting faces of the mold halves. Lens forming material is charged to the cavity 306 through a combined fill and vent conduit 308 in communication with an opening 310 formed through the second mold half 304. The fill and vent conduit 308 is open to passage of lens forming material when the mold halves are in an open, slightly separated position as shown in FIGS. 14E and 16C, and is closed to passage when the mold halves are fully engaged as shown in FIGS. 14F and 17C. The fill and vent conduit 308 can comprise a needle engagement channel and positioning stop for receiving a fill needle for delivery of lens forming material. The mold apparatus 300 optionally comprises a flat base 312 or one or more support legs for supporting the mold in a generally vertical orientation with the vent conduit at or adjacent the top or uppermost portion of the lens forming cavity 306.

FIG. 18 shows further details of another embodiment of a mold apparatus 320 for casting a lens substantially according to the method described above with regard to FIGS. 6A and 6B. Interengaging first and second mold halves 322 and 324 define a lens forming cavity 326 therebetween. A fill opening 328 and a vent opening 330 are preferably formed through the second mold half 324 for receiving lens forming material and for venting gas from the lens forming cavity, respectively. A snap fitting 326 is preferably provided, as seen best with reference to FIGS. 18F and 18G, for retaining the first and second mold halves in engagement with one another in their closed configuration. In the closed configuration of the mold apparatus, a knife edge interface between the first and second mold halves 322, 324, shown in FIG. 18E, permits passage of lens forming material into the lens forming cavity 326, and passage of fluid (including air or other gas and excess lens forming material) out of the lens forming cavity, only when lens forming material is introduced under sufficient pressure. In this manners the interface between mold halves 322, 324 functions as a pressure relief valve or check valve, selectively allowing or blocking the flow of lens forming material to and from the lens forming cavity.

FIG. 19 shows further details of another embodiment of a mold apparatus 340 for casting a lens substantially according to the method described above with regard to FIGS. 8A and 8B. First and second mold halves 342 and 344 engage in a nesting manner to define a lens forming cavity 346. Lens forming material fills the cavity when the mold 340 is submerged in a tank or other container of lens forming material. The first and second mold halves are closed arid engage one another by a snap closure 348 or other retaining means. The filled mold 340 is then removed from the tank for curing and further processing.

Figure 20C:
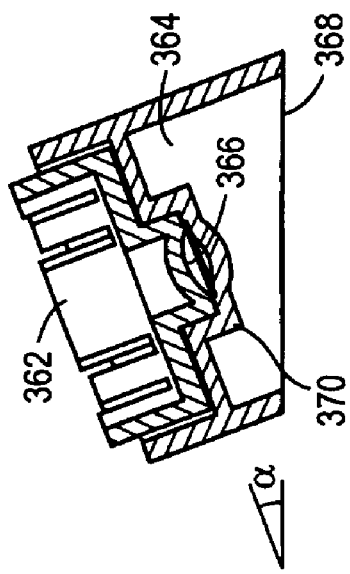
FIGS. 20A-20C show a molding apparatus according to another form of the present invention.
Figure 20B:
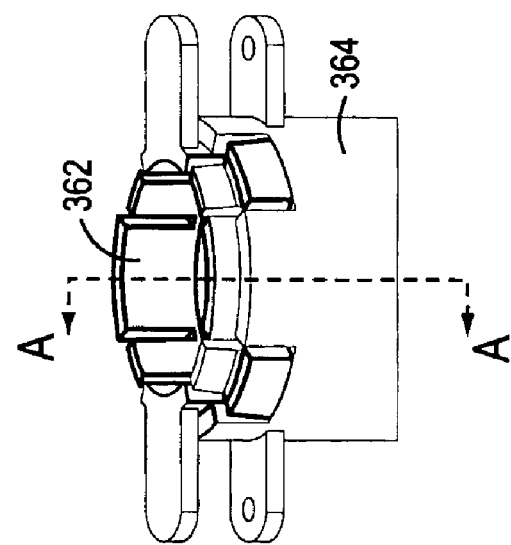
Figure 20A:
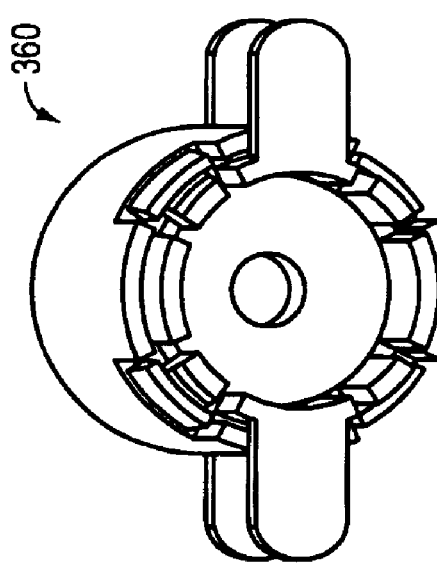

FIG. 20 shows another embodiment of a mold apparatus 360 for casting a lens according to one or more methods described herein. The mold 360 comprises a first mold half 362 engaged within a second mold half 364, to define a lens forming cavity 366 therebetween. The cavity 366 is preferably filled and vented using a fill needle connected to a pressurized source. Alternatively the cavity 366 is filled by submersion in a container of lens forming material, or is filled and vented through fill and vent conduits. One of the first and second mold halves (second mold half 364 in the depicted embodiment), comprises a base 368 that is sloped relative to the plane of the lens forming cavity 366. Placement of the base 368 in a horizontal position thereby results in the plane of the lens forming cavity being oriented at an angle of inclination relative to the horizontal. The mold half further comprises one or more walls 370 surrounding the cavity 366 to define a chamber that is filled with lens forming material prior to closure of the mold by engagement of the first mold half 362 within the second mold half. The slope of the base 368 is preferably sufficient to allow any air initially contained within the mold cavity 366 to be vented therefrom as the mold is closed. Excess lens forming material and air are discharged from the lens forming cavity 366 as the mold halves 362, 364 are engaged. The minimum slope angle α needed to achieve this venting will vary depending upon the degree of curvature of the lens forming surfaces of the cavity 366, the viscosity of the lens forming material, and/or other factors, but typically will be at least about 5E-90 E, and more preferably about 20E-90E.

Figure 21C:
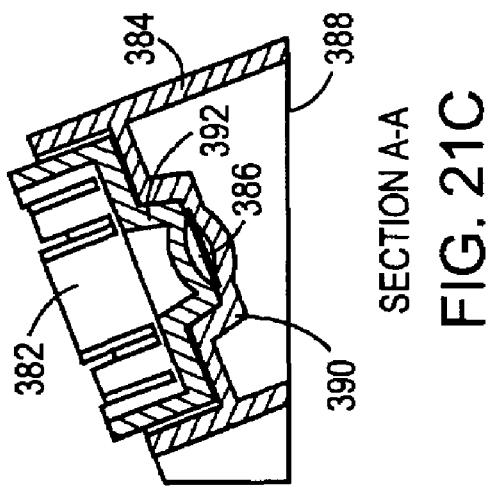
FIGS. 21A-21C show a molding apparatus according to another form of the present invention.
Figure 21B:
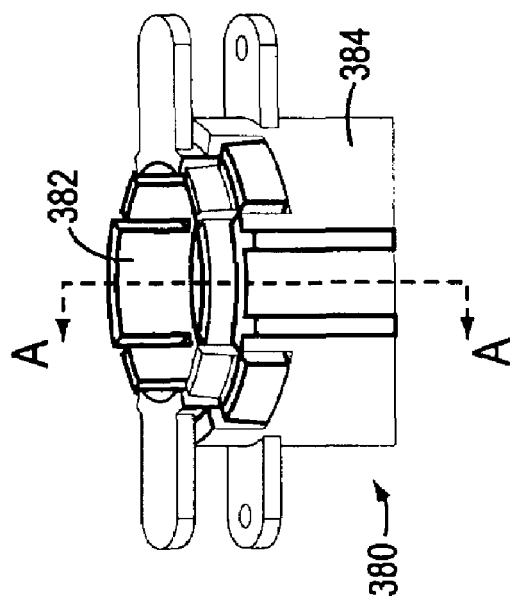
Figure 21A:
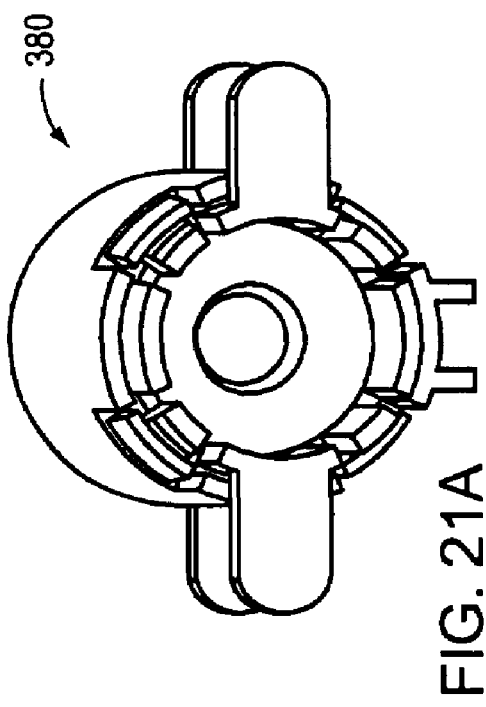
Figure 22G:
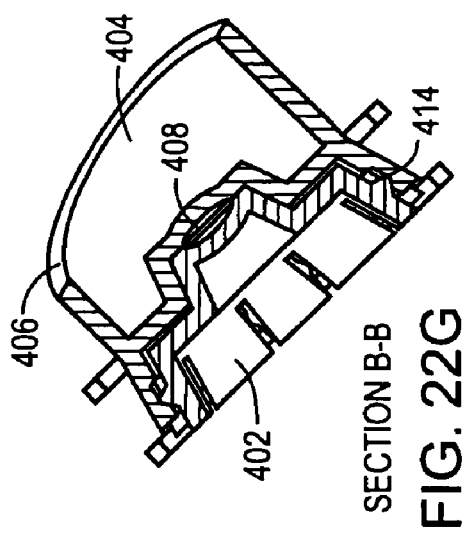
Figure 22E:
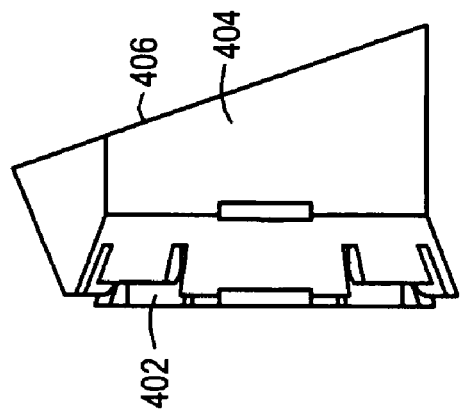
Figure 22D:
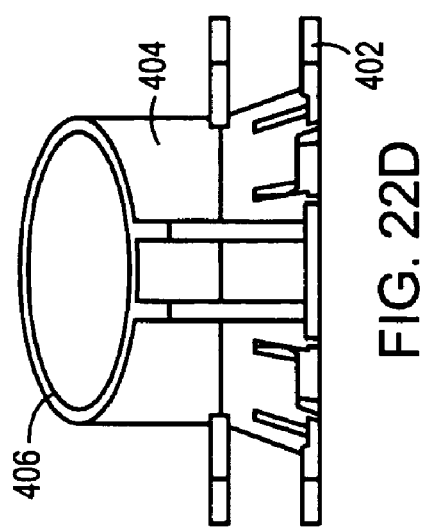
Figure 22F:
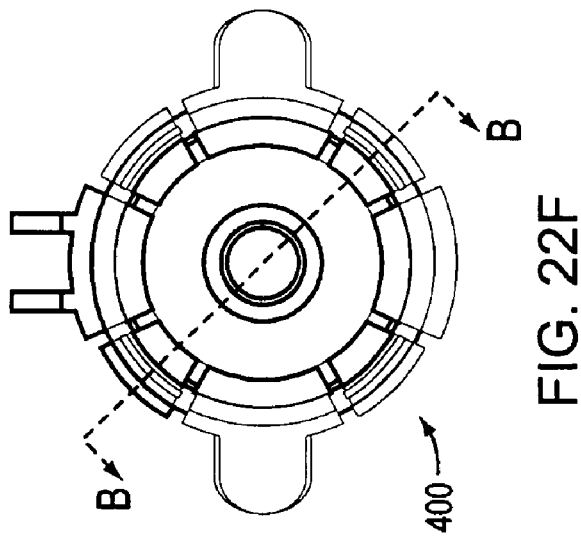
Figure 23D:
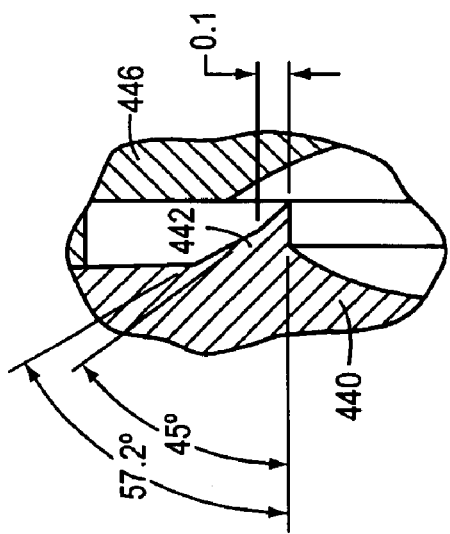
FIGS. 23A-23D show further details of a molding apparatus according to the present invention.
Figure 23C:
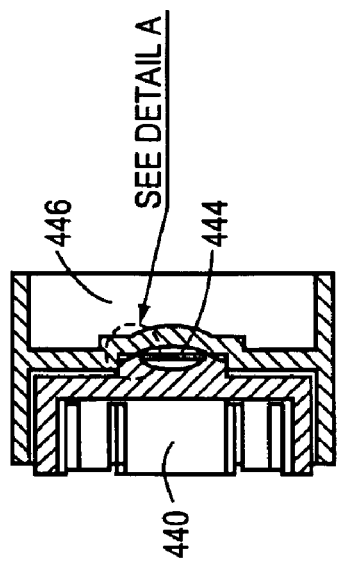
Figure 23A:
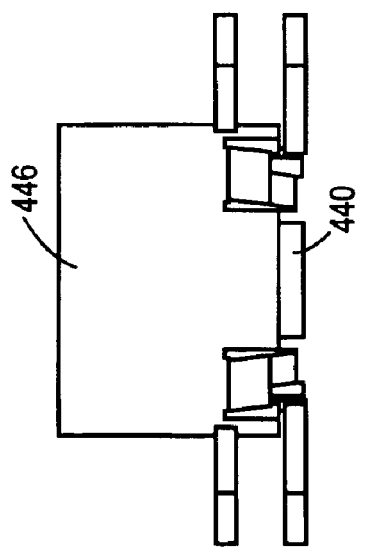
Figure 23B:
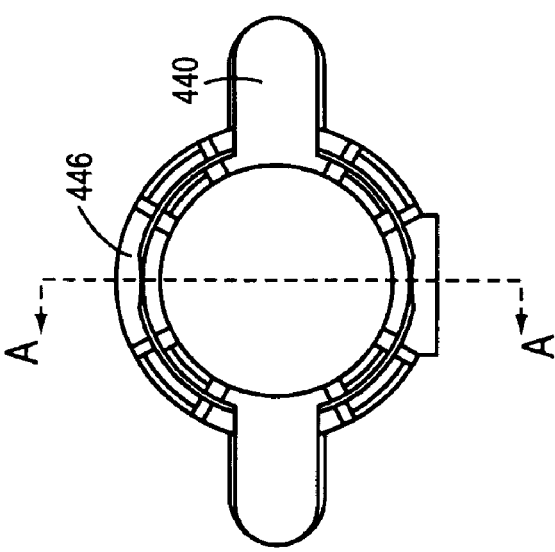

FIG. 21 shows another embodiment of a mold apparatus 380 according to the present invention. The mold apparatus 380 preferably comprises interengaging first and second mold halves 382, 384 defining a lens forming cavity 386, with one of the mold halves comprising a base 388 sloped relative to the plane of the lens forming cavity. Preferably, the lower mold half 384 comprises a recessed chamber bounded by a wall 390 surrounding the lens forming cavity 386, and the upper mold half 382 comprises a raised projection 392 for engagement within the recessed chamber of the lower mold half. In preferred form, the wall 390 is obliquely angled relative to the plane of the lens forming cavity, whereby the recessed chamber in the lower mold half takes the form of a truncated conical section that is wider at its mouth than at its base. The raised projection 392 of the upper mold half preferably comprises a cooperating truncated conical section adapted to be received within the recessed chamber in the lower mold half with a close fit. The provision of these inclined mating surfaces facilitates smoother engagement and separation of the mold halves, and/or improves dimensional control of a lens produced thereby.

FIG. 22 shows still another embodiment of a mold apparatus 400 of the present invention. The mold apparatus 400 is similar to the mold apparatus shown in FIGS. 20 and 21, with the inclusion of cooperating inclined faces of the first and second mold halves 402, 404. The base 406 of the mold 400 is preferably inclined at an angle a relative to the plane of the lens forming cavity 408, whereby air is released from the lens forming cavity as the mold halves are engaged. The first mold half 402 preferably comprises an inclined outer face 410 having the form of a truncated conical section, and the second mold half 404 preferably comprises an inclined inner face 412 also in the form of a truncated conical section. The inclined outer face 410 is adapted to be closely engaged within the inclined inner face 412 to provide smoother engagement and separation of the mold halves, and/or to improve dimensional control of the lens produced in the mold. As seen best with reference to FIG. 22G, interengaging snap fittings 414 or other retainers are optionally provided on the inclined faces 410, 412 to secure the mold halves together.

Figure 24D:
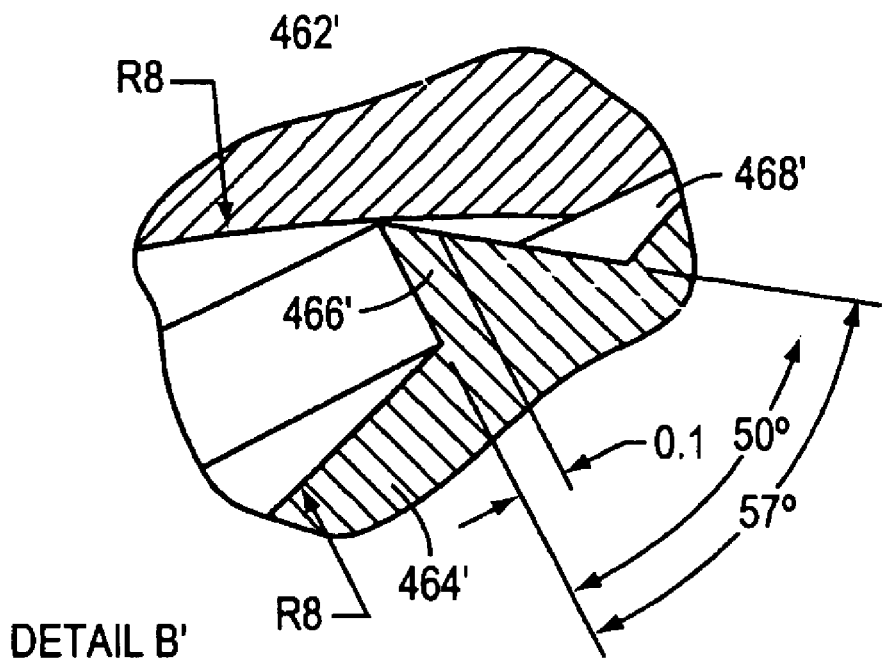
Figure 24E:
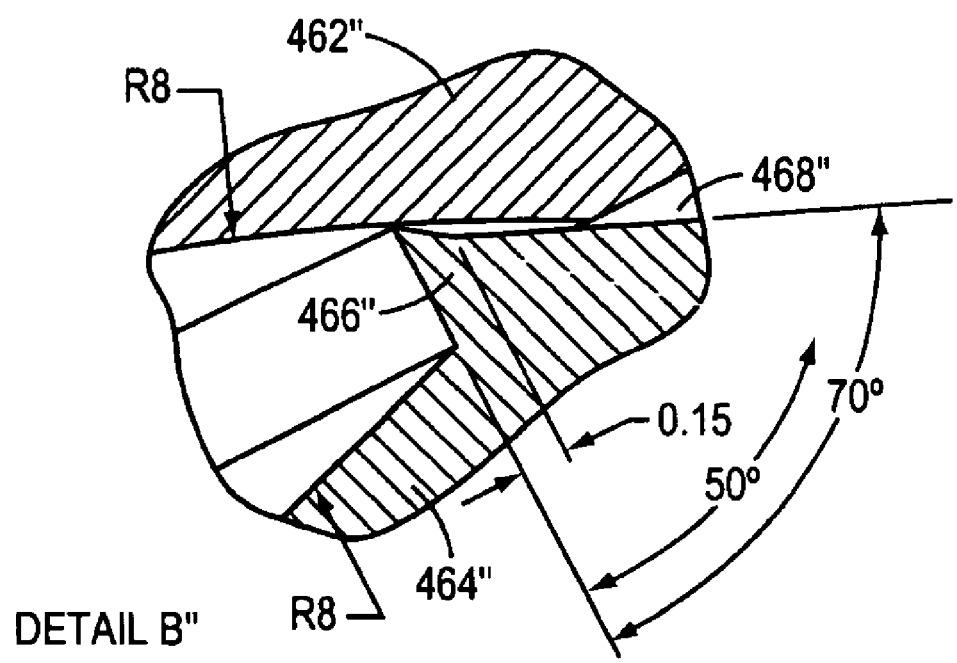

FIGS. 23 and 24 show further embodiments of mold apparatus according to the present invention, and including a knife edge interface between the first and second mold halves. For example, in the embodiment of FIG. 23, the first mold half 440 comprises a knife edge rim 442 surrounding a portion of the lens forming surface. As seen best with reference to FIG. 23D, the outer face of the rim 442 comprises a stepped incline having a base inclination of about 57.2E and a tip inclination of about 45E (both measured relative to an axis extending perpendicular to the plane of the lens forming cavity 444), and offset by about 0.1 mm. The inner face of the rim 442 preferably comprises a right cylindrical surface and a partial hemispherical surface defining one side of the lens forming cavity 444. The second mold half 446 preferably comprises another partial hemispherical surface defining the other side of the lens forming cavity. When the mold is closed, the tip of the knife edge rim 442 contacts the partial hemispherical surface of the second mold half to define and seal the lens forming cavity. Of course, it will be understood that the particular geometry of the knife edge interface will vary depending upon the desired lens geometry, the intended manner of delivery of lens forming material, and other factors. For example, and with reference now to FIG. 24, varying mold geometries of a mold apparatus 460 are shown. A first mold half 462 is engaged within a second mold half 464. A first mold geometry, shown in FIG. 24C, comprises a lens forming cavity having partial hemispherical surfaces of a relatively large radius of curvature (i.e., a relatively flat curve) of for example, 25 mm. The second mold half 464 comprises a knife edge rim 466 having a relatively flat base inclination of for example 75E and a tip inclination of for example 62E, offset by about 0.1 mm, measured relative to an axis extending perpendicular to the plane of the lens forming cavity. A second mold geometry, shown in FIG. 24D, comprises a lens forming cavity having partial hemispherical surfaces of a relatively small radius of curvature (i.e., a relatively sharp curve) of for example, 8 mm. The second mold half 464' comprises a knife edge rim 466' having a relatively steep base inclination of for example 57E and a tip inclination of for example 50E, offset by about 0.1 mm. A relatively open conduit 468' is formed between the first and second mold halves 462' and 464'. A third mold geometry, shown in FIG. 24E, comprises a lens forming cavity having partial hemispherical surfaces of a relatively small radius of curvature (i.e., a relatively sharp curve) of for example, 8 mm. The second mold half 464' comprises a knife edge rim 466' having a relatively shallow base inclination of for example 57E and a relatively steep tip inclination of for example 50E, offset by about 0.15 mm. A relatively closed conduit 468" is thereby formed between the first and second mold halves 462' and 464'.

The method of the present invention preferably comprises molding a lens in a mold apparatus substantially according to one or more of the embodiments disclosed herein. Lens forming material is charged to the mold apparatus by delivery from an external source or by immersion. The lens forming material is then cured and the resulting polymerized lens is removed from the mold. In the curing step, a polymerization and/or cross-linking reaction is caused to proceed by the action of heat, radiation or other activation mechanism. Typically, following the curing step, the polymerized lens is subjected to an extraction treatment and/or hydration with an appropriate solvent, such as for example water (including physiological saline and/or other aqueous solutions). The monomer(s), polymer(s), cross-linking agent, catalyst and/or solvent elute, while water and an artificial tear solution flow in. One or more haptics may be inserted into the molded lens, and the molded lens is preferably then packaged and sterilized prior to delivery to the consumer for use.

The invention has been clearly described in detail, with particular reference to certain preferred embodiments, in order to enable the reader to practice the invention without undue experimentation. Theories of operation have been offered to better enable the reader to understand the invention, but such theories do not limit the scope of the invention. In addition, a person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

What is claimed is:

1. A method of casting an ophthalmic lens, said method comprising:
   providing a mold defining a lens forming cavity having a circumferential edge;
   positioning the mold with the circumferential edge of the lens forming cavity lying in a plane that is inclined at an angle relative to horizontal; and
   delivering lens forming material into the lens forming cavity through an opening at the top of the mold.

2. The method of claim 1, further comprising the step of venting the lens forming cavity.

3. The method of claim 1, wherein the step of delivering lens forming material into the lens forming cavity comprises placement of a needle in communication with the lens forming cavity and delivery of lens forming material through the needle.

4. A method of casting an ophthalmic lens, said method comprising:

providing a mold defining a lens forming cavity having a circumferential edge;

positioning the mold with the circumferential edge of the lens forming cavity lying in a plane that is inclined at an angle relative to horizontal;

delivering lens forming material into the lens forming cavity; and placement of a body into the mold to form a haptic bore in the lens.

5. The method of claim 4, further comprising the step of venting the lens forming cavity.

6. The method of claim 4, wherein the lens forming material is delivered into the lens forming cavity through an opening at a bottom portion of the mold.

7. The method of claim 4, wherein the lens forming material is delivered into the lens forming cavity through an opening at a top portion of the mold.

8. The method of claim 4, wherein the step of delivering lens forming material into the lens forming cavity comprises placement of a needle in communication with the lens forming cavity and delivery of lens forming material through the needle.

9. A method of casting an ophthalmic lens, said method comprising:

providing a mold defining a lens forming cavity having a circumferential edge;

positioning the mold with the circumferential edge of the lens forming cavity lying in a plane that is inclined at an angle relative to horizontal; and delivering lens forming material into the lens forming cavity;

wherein the mold comprises first and second mold halves each having an inlet hole and a vent hole; and wherein said method further comprises engaging the first mold half with the second mold half and moving the first mold half relative to the second mold half between a fill position wherein the inlet holes and vent holes of the first and second mold halves are aligned, and a sealed position wherein the inlet holes and vent holes of the first and second mold halves are not aligned.

10. The method of claim 9, wherein the vent holes communicate with a top portion of the lens forming cavity in the fill position.

11. The method of claim 9, wherein the inlet holes communicate with a top portion of the lens forming cavity in the fill position.

12. The method of claim 9, wherein the inlet holes communicate with a bottom portion of the lens forming cavity in the fill position.

13. The method of claim 9, wherein the step of delivering lens forming material into the lens forming cavity comprises placement of a needle in communication with the lens forming cavity and delivery of lens forming material through the needle.

14. The method of claim 9, further comprising placement of a body into the mold to form a haptic bore in the lens.

15. A method of casting an ophthalmic lens, said method comprising:

providing a mold defining a lens forming cavity having a circumferential edge;

positioning the mold with the circumferential edge of the lens forming cavity lying in a plane that is inclined at an angle relative to horizontal; and delivering lens forming material into the lens forming cavity;

wherein the mold comprises first and second mold halves slidably engaging one another; and wherein said method comprises moving the first and second mold halves relative to one another between an open position for delivery of the lens forming material into the lens forming cavity and a closed position for curing the lens forming material to form the lens.

16. The method of claim 15, further comprising the step of venting the lens forming cavity.

17. The method of claim 15, wherein the lens forming material is delivered into the lens forming cavity through a bottom portion of the mold.

18. The method of claim 15, wherein the lens forming material is delivered into the lens forming cavity through a top portion of the mold.

19. The method of claim 15, wherein the step of delivering lens forming material into the lens forming cavity comprises placement of a needle in communication with the lens forming cavity and delivery of lens forming material through the needle.

20. The method of claim 15, further comprising placement of a body into the mold to form a haptic bore in the lens.

21. A method of casting an ophthalmic lens, said method comprising:

providing a mold defining a lens forming cavity having a circumferential edge;

positioning the mold with the circumferential edge of the lens forming cavity lying in a plane that is inclined at an angle relative to horizontal; and delivering lens forming material into the lens forming cavity by at least partially filling first and second mold halves with a lens forming material, and bringing the mold halves into engagement with one another to combine the lens forming material into a single mass.

22. The method of claim 21, further comprising the step of venting the lens forming cavity.

23. The method of claim 21, further comprising placement of a body into the mold to form a haptic bore in the lens.

24. A method of casting an ophthalmic lens, said method comprising:

providing a mold defining a lens forming cavity having a circumferential edge;

positioning the mold with the circumferential edge of the lens forming cavity lying in a plane that is inclined at an angle relative to horizontal; and delivering lens forming material into the lens forming cavity by submerging the mold at least partially within a container of lens forming material.

25. The method of claim 24, further comprising the step of venting the lens forming cavity.

26. The method of claim 24, further comprising placement of a body into the mold to form a haptic bore in the lens.

27. A method of casting an ophthalmic lens, said method comprising:

providing a mold defining a lens forming cavity having a circumferential edge;

positioning the mold with the circumferential edge of the lens forming cavity lying in a plane that is inclined at an angle relative to horizontal; and delivering lens forming material into the lens forming cavity under sufficient pressure to release fluid from a pressure release portion of the mold.

28. The method of claim 27, wherein the lens forming material is delivered into the lens forming cavity at a bottom portion of the mold.

29. The method of claim 27, wherein the lens forming material is delivered into the lens forming cavity at a top portion of the mold.

30. The method of claim 27, wherein the step of delivering lens forming material into the lens forming cavity comprises placement of a needle in communication with the lens forming cavity and delivery of lens forming material through the needle.

31. The method of claim 27, further comprising placement of a body into the mold to form a haptic bore in the lens.

32. A method of casting an ophthalmic lens, said method comprising:
  providing a mold defining a lens forming cavity having a circumferential edge;
  positioning the mold with the circumferential edge of the lens forming cavity lying in a plane that is inclined at an angle relative to horizontal; and
  delivering lens forming material into the lens forming cavity from a reservoir portion of the mold.

33. The method of claim 32, further comprising the step of venting the lens forming cavity.

34. The method of claim 32, further comprising placement of a body into the mold to form a haptic bore in the lens.

35. A method of casting an ophthalmic lens, said method comprising:
  at least partially filling a first mold half with lens forming material;
  at least partially filling a second mold half with lens forming material; and
  bringing the first and second mold halves into engagement with one another to define a lens forming cavity.

36. The method of claim 35, further comprising placement of a body into the mold to form a haptic bore in the lens.

37. The method of claim 35, wherein the first and second mold halves are at least partially filled with lens forming material by submersion of the mold halves at least partially into a container of lens forming material.

38. A method of casting an ophthalmic lens, said method comprising:
  providing a mold cavity within a mold, the cavity defining the ophthalmic lens to be cast;
  introducing a lens forming material into the mold cavity through an opening in the top portion of the mold;
  venting fluid through at least one opening in a top portion of the mold; and
  curing the lens forming material in the mold cavity to form the lens.

39. The method of claim 38, further comprising placement of a body into the mold to form a haptic bore in the lens.

40. The method of claim 38, wherein the step of introducing the lens forming material into the mold cavity comprises placement of a needle into the opening in the top portion of the mold and delivering the lens forming material through the needle.

* * * * *